United States Patent
Yan et al.

(10) Patent No.: US 12,408,225 B2
(45) Date of Patent: Sep. 2, 2025

(54) METHOD AND APPARATUS FOR PERFORMING RANDOM ACCESS

(71) Applicant: Lenovo (Beijing) Limited, Beijing (CN)

(72) Inventors: Le Yan, Shanghai (CN); Haiming Wang, Beijing (CN); Mingzeng Dai, Shanghai (CN); Lianhai Wu, Beijing (CN); Congchi Zhang, Shanghai (CN)

(73) Assignee: Lenovo (Beijing) Limited, Beijing (CN)

( * ) Notice: Subject to any disclaimer, the term of this patent is extended or adjusted under 35 U.S.C. 154(b) by 332 days.

(21) Appl. No.: 18/270,345

(22) PCT Filed: Dec. 31, 2020

(86) PCT No.: PCT/CN2020/142249
§ 371 (c)(1),
(2) Date: Jun. 29, 2023

(87) PCT Pub. No.: WO2022/141438
PCT Pub. Date: Jul. 7, 2022

(65) Prior Publication Data
US 2024/0121832 A1    Apr. 11, 2024

(51) Int. Cl.
```
H04W 76/19      (2018.01)
H04L 1/1607     (2023.01)
H04W 74/0833    (2024.01)
H04W 74/0836    (2024.01)
H04W 76/18      (2018.01)
```
(52) U.S. Cl.
CPC ........... *H04W 76/19* (2018.02); *H04L 1/1607* (2013.01); *H04W 74/0833* (2013.01); *H04W 74/0836* (2024.01); *H04W 76/18* (2018.02)

(58) Field of Classification Search
CPC . H04W 74/0841; H04W 76/28; H04W 76/11; H04W 74/0838; H04W 74/0836; H04L 1/0023; H04L 1/0015; Y02D 30/70
See application file for complete search history.

(56) References Cited

U.S. PATENT DOCUMENTS

| | | | |
|---|---|---|---|
| 12,349,229 B2 * | 7/2025 | Jeon | H04W 76/28 |
| 2018/0205516 A1 * | 7/2018 | Jung | H04W 74/0836 |
| 2019/0350010 A1 * | 11/2019 | Guo | H04W 74/0833 |
| 2023/0044448 A1 * | 2/2023 | Lin | H04W 74/0808 |

(Continued)

FOREIGN PATENT DOCUMENTS

| | | |
|---|---|---|
| CN | 111586707 A | 8/2020 |
| CN | 111953460 A | 11/2020 |

OTHER PUBLICATIONS

PCT/CN2020/142249, "International Preliminary Report on Patentability", PCT Application No. PCT/CN2020/142249, Jul. 13, 2023, 6 pages.

(Continued)

*Primary Examiner* — Mahran Y Abu Roumi
(74) *Attorney, Agent, or Firm* — FIG. 1 Patents

(57) ABSTRACT

A method for performing random access includes: performing a 2-step RA procedure with a BS (S401); receiving a fallback RAR from BS (S404); performing a 4-step RA procedure with BS (S405); and associating a 2-step RA information of the 2-step RA procedure with a 4-step RA information of the 4-step RA procedure (S407).

14 Claims, 17 Drawing Sheets

(56) References Cited

U.S. PATENT DOCUMENTS

| 2023/0269823 A1* | 8/2023 | Jeon | H04W 74/0841 |
| | | | 370/329 |
| 2024/0121829 A1* | 4/2024 | Zhang | H04W 74/006 |
| 2024/0121832 A1* | 4/2024 | Yan | H04W 76/18 |

OTHER PUBLICATIONS

PCT/CN2020/142249, "International Search Report and Written Opinion", PCT Application No. PCT/CN2020/142249, Sep. 28, 2021, 8 pages.

* cited by examiner

METHOD AND APPARATUS FOR PERFORMING RANDOM ACCESS

TECHNICAL FIELD

Embodiments of the present application generally relate to wireless communication technology, especially to a method and an apparatus for performing random access under 3GPP (3rd Generation Partnership Project) 5G New Radio (NR).

BACKGROUND

In network of 3rd Generation Partnership Project (3GPP) 5G New Radio (NR), the user equipment (UE) performs one or more 2-step random access (RA) procedure and/or one or more 4-step RA procedure with the base station (BS) during a whole RA procedure. The UE can store the information of 2-step RA procedure and 4-step procedure and report the information to the BS for the BS to understand the status of the UE.

Because the stored information of 4-step RA procedure is different from the information of 2-step RA procedure, at UE side, different entries are used for respectively storing the information of 4-step RA procedure and the information of 2-step RA procedure. However, specific details of associating the information stored in different entries have not been discussed yet and there are still some issues that need to be solved.

SUMMARY

Some embodiments of the present application provide a method for a user equipment (UE). The method includes: performing a 2-step random access (RA) procedure with a base station (BS); receiving a fallback RA response (RAR) from the BS; performing a 4-step RA procedure with the base station according to the fallback RAR; and associating a 2-step RA information of the 2-step RA procedure with a 4-step RA information of the 4-step RA procedure.

Some embodiments of the present application provide a method for a BS. The method includes: performing a 2-step RA procedure with a UE; transmitting a fallback RAR to the UE when the 2-step RA procedure fails; performing a 4-step RA procedure with the UE after transmitting the fallback RAR; receiving a message from the UE, wherein the message includes 2-step RA information related to the 2-step RA procedure and 4-step RA information related to the 4-step RA procedure; and determining an order of the 2-step RA procedure and the 4-step RA procedure according to the 2-step RA information and the 4-step RA information.

Some embodiments of the present application provide an apparatus. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method for wireless communications.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), etc. It is contemplated that along with the 3GPP and related communication technology development, the terminologies recited in the present application may change, which should not affect the principle of the present application.

Figure 1:
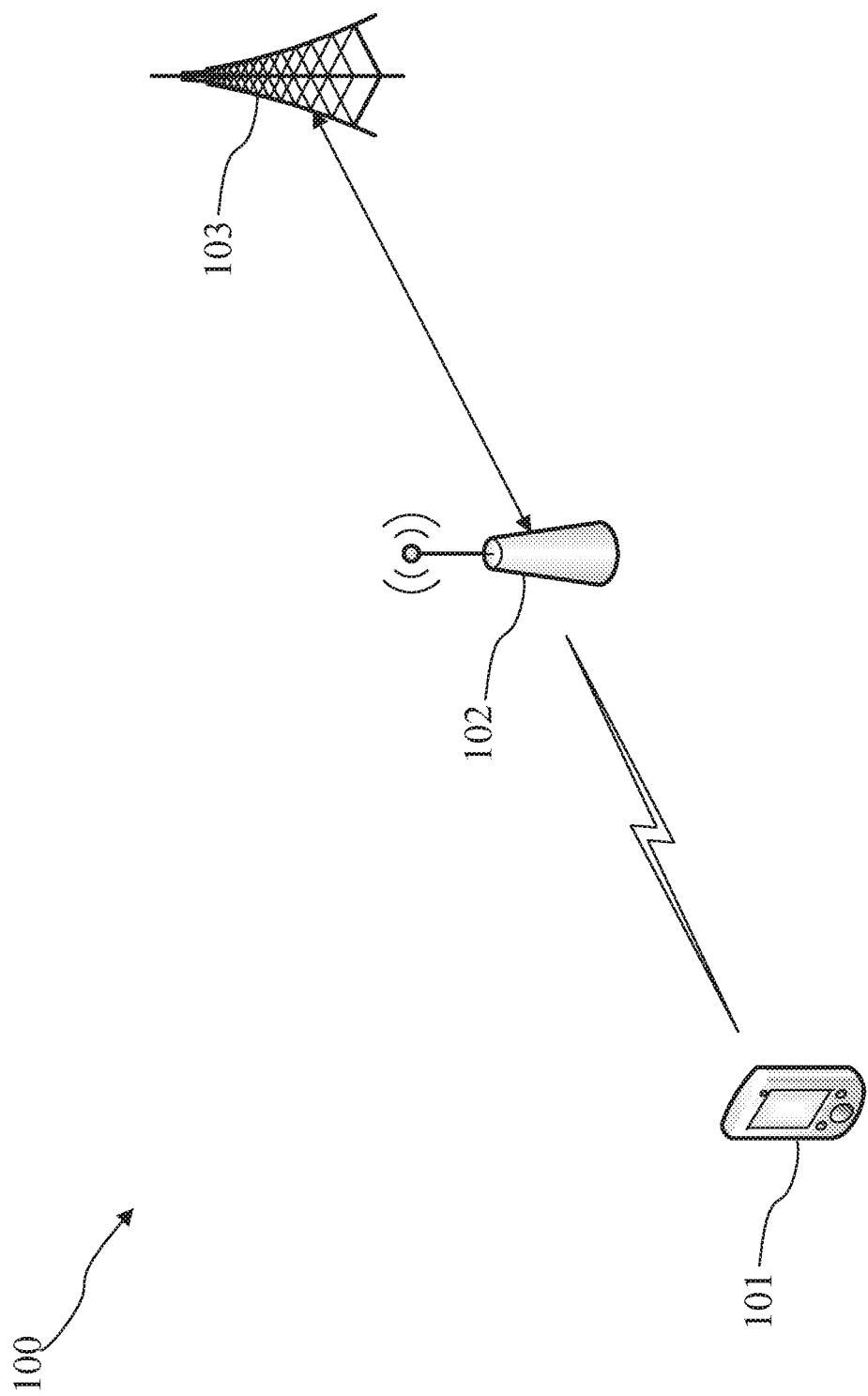
FIG. 1 illustrates a schematic diagram of a wireless communication system in accordance with some embodiments of the present application.

Referring to FIG. 1, a wireless communication system 100 may include a user equipment (UE) 101, a base station (BS) 102 and a core network (CN) 103. Although a specific number of the UE 101, the BS 102 and the CN 103 are depicted in FIG. 1, it is contemplated that any number of the UEs 101, the BSs 102 and the CNs 103 may be included in the wireless communication system 100.

The CN 103 may include a core Access and Mobility management Function (AMF) entity. The BS 102, which may communicate with the CN 103, may operate or work under the control of the AMF entity. The CN 103 may further include a User Plane Function (UPF) entity, which communicatively coupled with the AMF entity.

The BS 102 may be distributed over a geographic region. In certain embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s).

The UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, or the like.

According to some embodiments of the present application, the UE 101 may include, for example, but is not limited to, a portable wireless communication device, a smart phone, a cellular telephone, a flip phone, a device having a subscriber identity module, a personal computer, a selective call receiver, a wireless sensor, a monitoring device, or any other device that is capable of sending and receiving communication signals on a wireless network.

In some embodiments of the present application, the UE 101 may include, for example, but is not limited to, wearable devices, such as smart watches, fitness bands, optical head-mounted displays, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE 101 may communicate directly with the BS 102 via uplink communication signals.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G New Radio (NR) of the 3GPP protocol or the 5G NR-light of the 3GPP protocol, wherein the BS 102 transmits data using an OFDM modulation scheme on the downlink (DL) and the UE 101 transmits data on the uplink (UL) using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the UE 101 and BS 102 may communicate using other communication protocols, such as the IEEE 802.11 family of wireless communication protocols. Further, in some embodiments of the present application, the UE 101 and BS 102 may communicate over licensed spectrums, whereas in other embodiments, the UE 101 and BS 102 may communicate over unlicensed spectrums. The present application is not intended to be limited to the implementation of any particular wireless communication system architecture or protocol. In yet some embodiments of present application, the BS 102 may communicate with the UE 101 using the 3GPP 5G protocols.

According to some existing agreements, 2-step random access (RA) procedure and 4-step RA procedure are introduced. UE 101 may perform one or more 2-step RA procedure(s) and/or one or more 4-step RA procedure(s) with BS 102 during a complete RA procedure, i.e., UE 101 may perform one or more 2-step RA procedure(s) and/or one or more 4-step RA procedure(s) with a cell managed by BS 102 during a complete RA procedure. For BS 102 to understand status of UE 101, UE 101 may store information of 2-step RA procedure(s) and 4-step procedure(s) and report the information to BS 102.

For example, information of 2-step RA procedure may at least include: cell identification of the cell in which RA procedure is performed, purpose of RA procedure, frequency information of RA resources, number of preambles sent on a Synchronization Signal and physical broadcast channel Block (SSB), beam index, contention detection per RA attempt, indication indicating whether fallback RA response (RAR) is received, indication indicating whether beam quality is higher than a threshold (e.g., threshold of msgA-RSRP-ThresholdSSB-r16 defined in 3GPP specification), indication indicating whether beam quality is higher than another threshold (e.g., threshold of msgA-RSRP-Threshold-r16 defined in 3GPP specification), and etc.

For example, information of 4-step RA procedure may at least include: cell identification of the cell in which RA procedure is performed, purpose of RA procedure, frequency information of RA resources, number of preambles sent on an SSB, beam index, contention detection per RA attempt, and etc.

Because the information of 4-step RA procedure may be different from the information of 2-step RA procedure, to make the stored information more clearly, different entries may be used by UE 101 for respectively storing the information of 4-step RA procedure and the information of 2-step RA procedure. To make BS which receives the information of 2-step RA procedure and/or the information of 4-step RA procedure understand the order of 2-step RA procedure and 4-step RA procedure, the information of 2-step RA procedure and the information of 4-step RA procedure should be associated. However, specific details of associating the information stored in different entries have not been discussed yet and there are still some issues that need to be solved.

Accordingly, in the present disclosure, details of associating 2-step RA procedure(s) with 4-step RA procedure(s) will be introduced. More details on embodiments of the present disclosure will be further described hereinafter.

Figure 2:
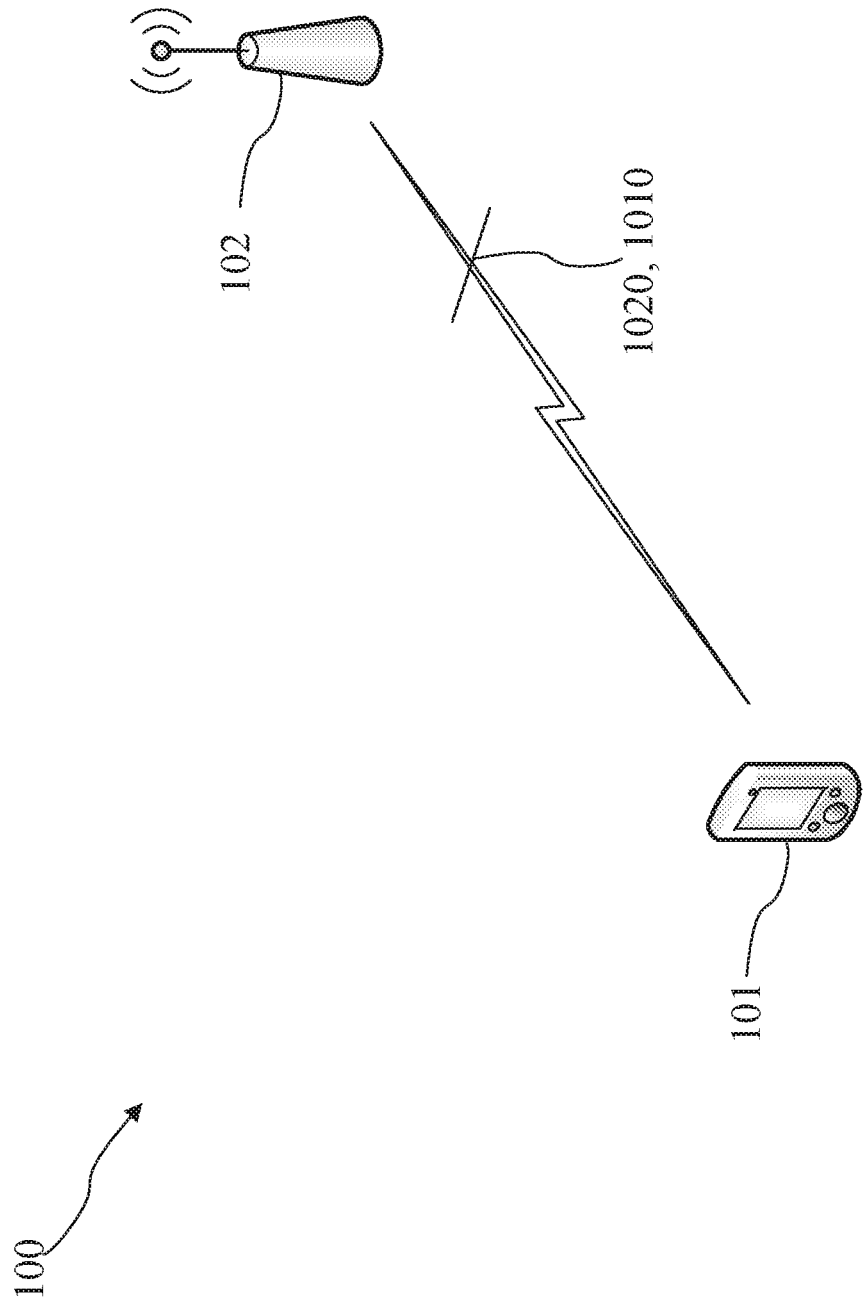
FIG. 2 illustrates a schematic diagram of message transmissions in accordance with some embodiments of the present application.

Please refer to FIG. 2, which is a schematic diagram of message transmissions between the UE 101 and the BS 102 in accordance with some embodiments of the present application. In some embodiments, during an RA procedure, UE 101 may perform a 2-step RA procedure with BS 102. When the 2-step RA procedure fails, BS 102 may transmit a fallback RAR 1020 to UE 101. The fallback RAR 1020 may be transmitted via message B (i.e., MSG-B of 2-step RA procedure defined in 3GPP specification).

According to the fallback RAR 1020 from BS 102, UE 101 may perform a 4-step RA procedure. Then, UE 101 may associate a 2-step RA information of the 2-step RA procedure with a 4-step RA information of the 4-step RA procedure. In some implementations, UE 101 may store the 2-step RA information may in a first entry and store the 4-step RA information in a second entry.

In some implementations, when RA procedure between UE 101 and BS 102 is successful, if BS 102 requests RA report from UE 101 via a request message (e.g., UE Information Request message), UE 101 may transmit a message 1010 (e.g., UE Information Response message) to BS 102. The message 1010 may include the 2-step RA information stored in the first entry and the 4-step RA procedure information stored in the second entry. After receiving the message 1010, BS 102 may determine the association (e.g., an order) of the 2-step RA procedure and the 4-step RA procedure according to the 2-step RA information and the 4-step RA information.

In some implementations, when RA procedure between UE 101 and BS 102 is successful, if another BS (not shown) requests RA report from UE 101 via a request message, UE 101 may transmit the message 1010 to the another BS. The message 1010 may include the 2-step RA information stored in the first entry and the 4-step RA procedure information stored in the second entry. After receiving the message 1010, the another BS may determine the association (e.g., an order) of the 2-step RA procedure and the 4-step RA procedure according to the 2-step RA information and the 4-step RA information. For example, the another BS may be a BS that UE 101 subsequently connects with.

In some implementations, when RA procedure between UE 101 and BS 102 is failed, if another BS (not shown) requests RA report from UE 101 via a request message, UE 101 may transmit the message 1010 to the another BS. The message 1010 may include the 2-step RA information stored in the first entry and the 4-step RA procedure information stored in the second entry. After receiving the message 1010, the another BS may determine the association (e.g., an order) of the 2-step RA procedure and the 4-step RA procedure according to the 2-step RA information and the 4-step RA information. For example, the another BS may be a BS that UE 101 performs RRC re-establishment with.

Figure 3A:
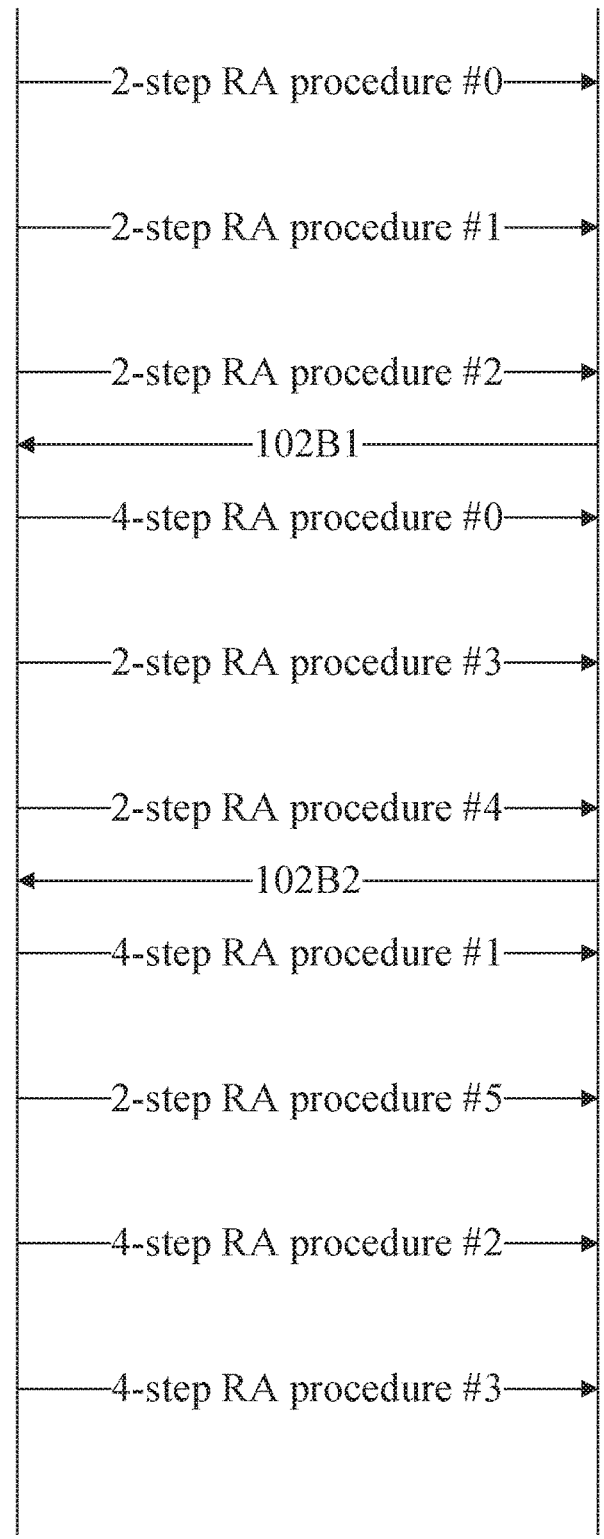
FIG. 3A illustrates an example of a whole RA procedure between the UE and the BS.

Please refer to FIG. 3A, which illustrates an example of a whole RA procedure between the UE 101 and the BS 102. In detail, in the whole RA procedure, UE 101 performs 2-step RA procedure #0 with BS 102, and 2-step RA procedure #0 fails. UE 101 performs 2-step RA procedure #1 with BS 102, and 2-step RA procedure #1 fails. UE 101 performs 2-step RA procedure #2 with BS 102, and 2-step RA procedure #2 fails.

After 2-step RA procedure #2 fails, UE 101 receives a fallback RAR 102B1 from BS 102. According to the fallback RAR 102B1, UE 101 performs 4-step RA procedure #0 with BS 102. 4-step RA procedure #0 fails. UE 101 performs 2-step RA procedure #3 with BS 102, and 2-step RA procedure #3 fails. UE 101 performs 2-step RA procedure #4 with BS 102, and 2-step RA procedure #4 fails.

After 2-step RA procedure #4 fails, UE 101 receives a fallback RAR 102B2 from BS 102. According to the fallback RAR 102B2, UE 101 performs 4-step RA procedure #1 with BS 102. 4-step RA procedure #1 fails. UE 101 performs 2-step RA procedure #5 with BS 102, and 2-step RA procedure #5 fails.

In this example, a number of maximum transmission (e.g., msgA-TransMax or msgA-TransMax-r16 used for 2-step RA procedure defined in 3GPP specification) of message A (i.e., MSG-A of 2-step RA procedure defined in 3GPP specification) is '6'. In other words, the maximum attempts of 2-step RA procedure is '6'. Therefore, after the sixth 2-step RA procedure (i.e., 2-step RA procedure #5) fails, because the number of maximum transmission of MSG-A is reached, UE 101 performs one or more 4-step RA procedure (s) until: (1) a number of maximum transmission of preambles is reached; or (2) the RA procedure is successful. In this example, UE 101 performs 4-step RA procedures #2 and #3 with BS 102 after the number of maximum transmission of MSG-A is reached.

Figure 3B:
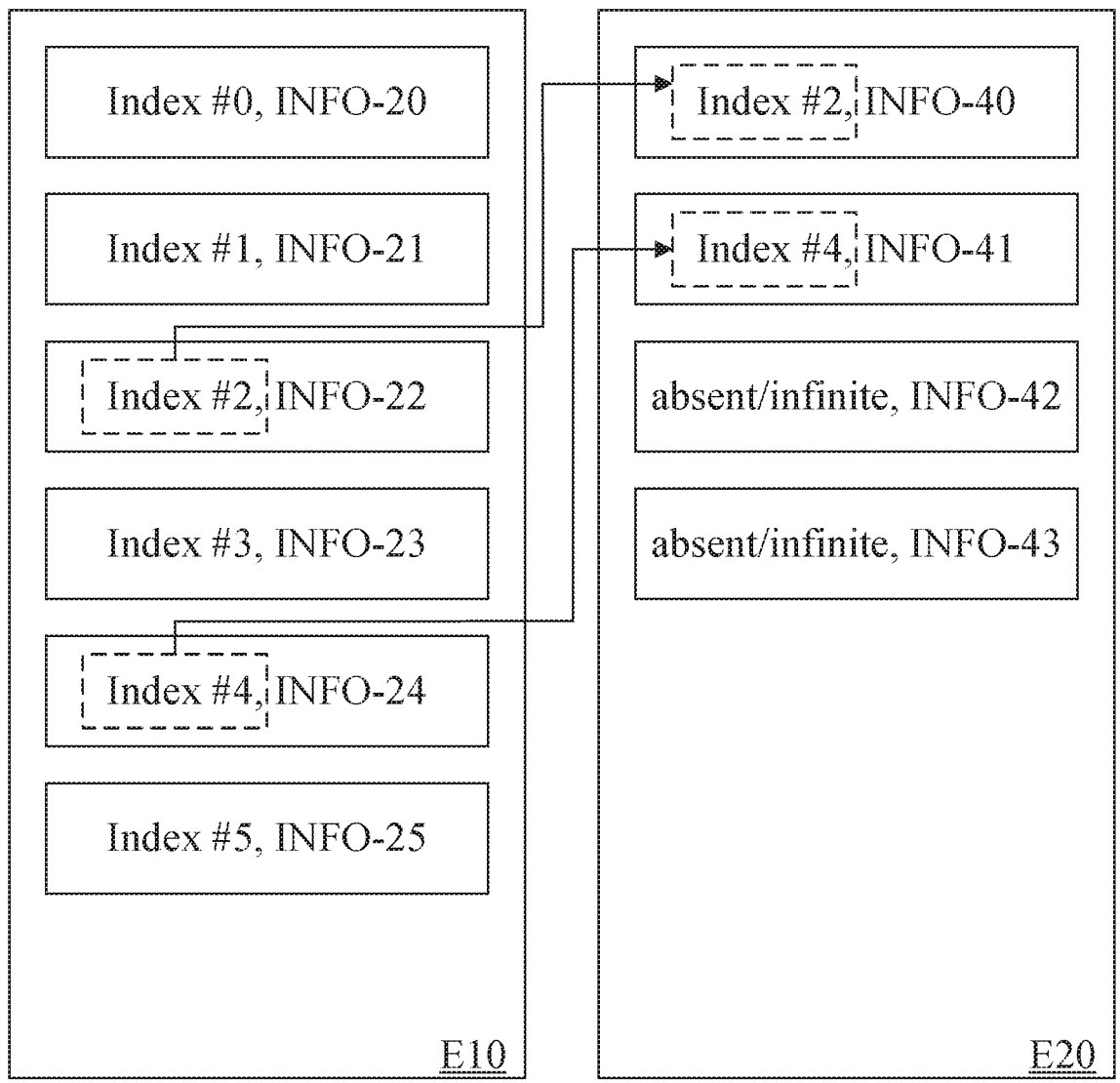
FIGS. 3B to 3D illustrate schematic diagrams of associations between the information of 2-step RA procedures and the information of 4-step RA procedures.

Please refer to FIG. 3B, which is a schematic diagram of association between the information of 2-step RA procedures and the information of 4-step RA procedures. In some implementations, information of 2-step RA procedures #0 to #5 and information of 4-step RA procedures #0 to #1 are associated by explicit index configured for each 2-step RA procedure/2-step RA information.

In particular, during the whole RA procedure depicted in FIG. 3A, UE 101 sets different indexes to different information of 2-step RA procedures. More specifically, UE 101 sets index #0 to 2-step RA information INFO-20 of 2-step RA procedure #0. UE 101 stores 2-step RA information INFO-20 with index #0 in a first entry E10 which is configured to store information of 2-step RA procedure. UE 101 sets index #1 to 2-step RA information INFO-21 of 2-step RA procedure #1. UE 101 stores 2-step RA information INFO-21 with index #1 in the first entry E10. UE 101 sets index #2 to 2-step RA information INFO-22 of 2-step RA procedure #2. UE 101 stores 2-step RA information INFO-22 with index #2 in the first entry E10.

Because UE 101 receives the fallback RAR 102B1 corresponding to 2-step RA procedure #2 so that UE 101 performs 4-step RA procedure #0 according to the fallback RAR 102B1, UE 101 sets index #2 of 2-step RA information INFO-22 of 2-step RA procedure #2 to 4-step RA information INFO-40 of 4-step RA procedure #0. UE 101 stores 4-step RA information INFO-40 with index #2 in a second entry E20 which is configured to store information of 4-step RA procedure.

UE 101 sets index #3 to 2-step RA information INFO-23 of 2-step RA procedure #3. UE 101 stores 2-step RA information INFO-23 with index #3 in the first entry E10. UE 101 sets index #4 to 2-step RA information INFO-24 of 2-step RA procedure #4. UE 101 stores 2-step RA information INFO-24 with index #4 in the first entry E10.

Because UE 101 receives the fallback RAR 102B2 corresponding to 2-step RA procedure #4 so that UE 101 performs 4-step RA procedure #1 according to the fallback RAR 102B2, UE 101 sets index #4 of 2-step RA information INFO-24 of 2-step RA procedure #4 to 4-step RA information INFO-41 of 4-step RA procedure #1. UE 101 stores 4-step RA information INFO-41 with index #4 in the second entry E20.

UE 101 sets index #5 to 2-step RA information INFO-25 of 2-step RA procedure #5. UE 101 stores 2-step RA information INFO-25 with index #5 in the first entry E10. When the number of maximum transmission of MSG-A is reached, UE 101 sets indexes of 4-step RA information of the following 4-step RA procedures (i.e., index of 4-step RA information INFO-42 of 4-step RA procedures #2 and index of 4-step RA information INFO-43 of 4-step RA procedures #3) as absent or infinite. UE 101 stores 4-step RA information INFO-42 together with index, and 4-step RA information INFO-43 together with index in the second entry E20.

In some implementations, when the whole RA procedure is successful, if BS 102 requests RA report from UE 101 via a request message, UE 101 transmits the message 1010 to BS 102. The message 1010 includes the 2-step RA information in the first entry E10 and the 4-step RA procedure information in the second entry E20. After receiving the message 1010, BS 102 determines an order (i.e., chronological order) of the 2-step RA procedures #0 to #5 and the 4-step RA procedures #0 to #3 according to the 2-step RA information and the 4-step RA information.

In some implementations, when RA procedure between UE 101 and BS 102 is successful, if another BS (not shown) requests RA report from UE 101 via a request message, UE 101 may transmit the message 1010 to the another BS. The message 1010 includes the 2-step RA information in the first entry E10 and the 4-step RA procedure information in the second entry E20. After receiving the message 1010, the another BS may determines an order (i.e., chronological order) of the 2-step RA procedures #0 to #5 and the 4-step RA procedures #0 to #3 according to the 2-step RA information and the 4-step RA information. For example, the another BS may be a BS that UE 101 subsequently connects with.

In some implementations, when the whole RA procedure is failed, if another BS (not shown) requests RA report from UE 101 via a request message, UE 101 may transmit the message 1010 to the another BS. The message 1010 includes the 2-step RA information in the first entry E10 and the 4-step RA procedure information in the second entry E20. After receiving the message 1010, the another BS determines an order (i.e., chronological order) of the 2-step RA procedures #0 to #5 and the 4-step RA procedures #0 to #3 according to the 2-step RA information and the 4-step RA information. For example, the another BS may be a BS that UE 101 performs RRC re-establishment with.

More specifically, when one index set to the 4-step RA information is the same as one index set to the 2-step RA information, it means that the corresponding 4-step RA procedure follows the corresponding 2-step RA procedure. Therefore, after receiving the message 1010, BS 102 or the another BS determines the chronological order of the RA procedures as follows:

(1) 2-step RA procedure #0 corresponding to 2-step RA information INFO-20 with index #0;
(2) 2-step RA procedure #1 corresponding to 2-step RA information INFO-21 with index #1;
(3) 2-step RA procedure #2 corresponding to 2-step RA information INFO-22 with index #2;
(4) 4-step RA procedure #0 corresponding to 4-step RA information INFO-40 with index #2 which is the same as index #2 set to the 2-step RA information of 2-step RA procedure #2;
(5) 2-step RA procedure #3 corresponding to 2-step RA information INFO-23 with index #3;
(6) 2-step RA procedure #4 corresponding to 2-step RA information INFO-24 with index #4;
(7) 4-step RA procedure #1 corresponding to 4-step RA information INFO-41 with index #4 which is the same as index #4 set to the 2-step RA information of 2-step RA procedure #4;
(8) 2-step RA procedure #5 corresponding to 2-step RA information INFO-25 with index #5;
(9) 4-step RA procedure #2 corresponding to 4-step RA information INFO-42 with index absent/infinite;
(10) 4-step RA procedure #3 corresponding to 4-step RA information INFO-43 with index absent/infinite.

Figure 3C:
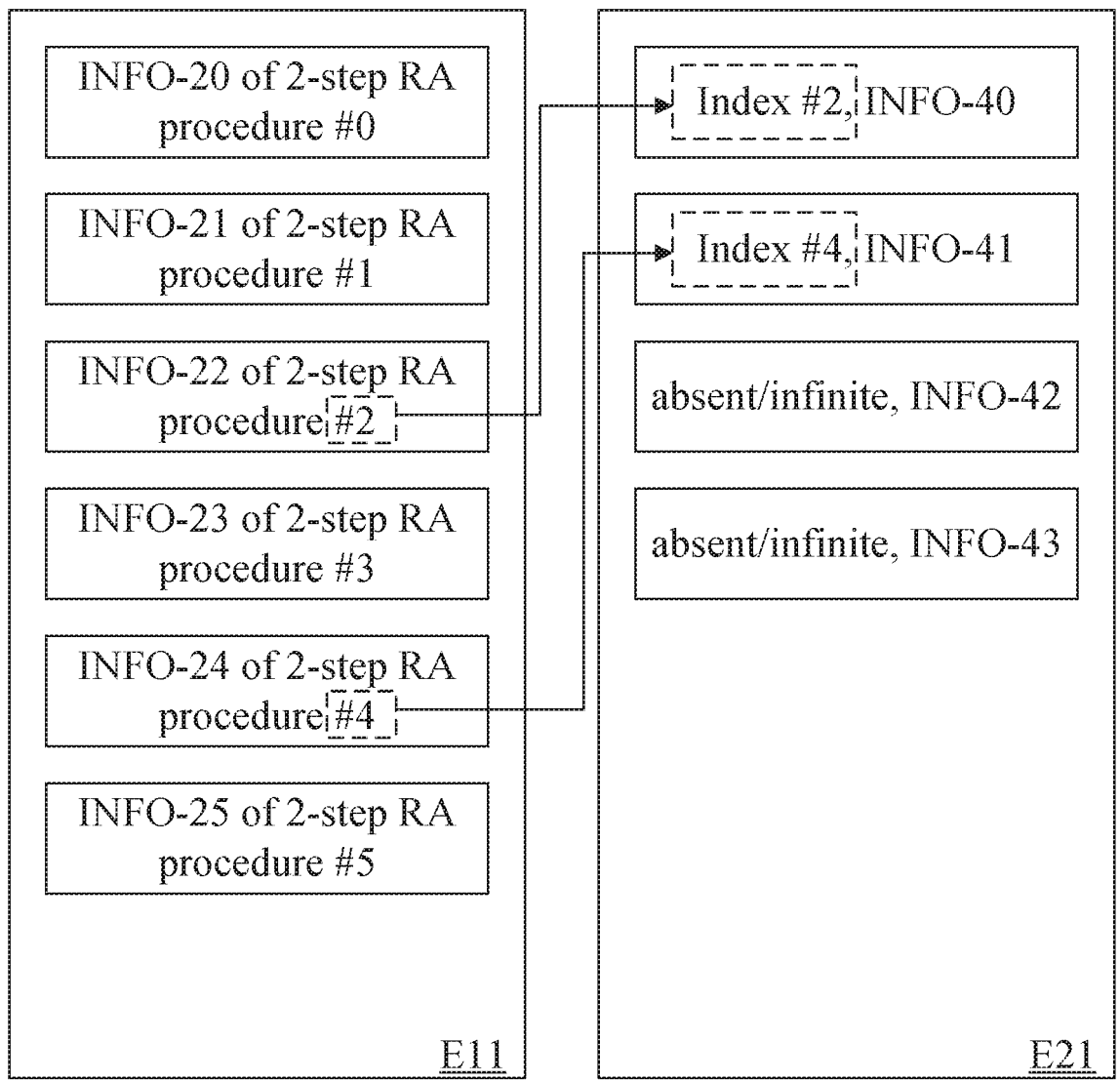

Please refer to FIG. 3C, which is a schematic diagram of association between the information of 2-step RA procedures and the information of 4-step RA procedures. In some implementations, information of 2-step RA procedures #0 to #5 and information of 4-step RA procedures #0 to #1 are associated by sequence number(s) of 2-step RA procedure (s).

In particular, during the whole RA procedure depicted in FIG. 3A, UE 101 sets the index of the 4-step RA information of the 4-step RA procedure by a sequence number of the corresponding 2-step RA procedure. In other words, when the 4-step RA procedure is triggered by receiving the fallback RAR during 2-step RA procedure #N, sequence number 'N' is used as the index of the 4-step RA information of the 4-step RA procedure.

More specifically, during the whole RA procedure, UE 101 stores 2-step RA information INFO-20 in a first entry E11 which is configured to store information of 2-step RA procedure. UE 101 stores 2-step RA information INFO-21 in the first entry E11. UE 101 stores 2-step RA information INFO-22 in the first entry E11. In some implementations, the sequence number of 2-step RA procedure #0 is "0", the sequence number of 2-step RA procedure #1 is "1", the sequence number of 2-step RA procedure #2 is "2".

Because UE 101 receives the fallback RAR 102B1 corresponding to 2-step RA procedure #2 so that UE 101 performs 4-step RA procedure #0 according to the fallback RAR 102B1, UE 101 sets index of 4-step RA information INFO-40 of 4-step RA procedure #0 to be the sequence number of 2-step RA procedure #2. UE 101 stores 4-step RA information INFO-40 with index #2 in a second entry E21 which is configured to store information of 4-step RA procedure.

UE 101 stores 2-step RA information INFO-23 in the first entry E10. UE 101 stores 2-step RA information INFO-24 in the first entry E10. In some implementations, the sequence number of 2-step RA procedure #3 is "3", the sequence number of 2-step RA procedure #4 is "4".

Because UE 101 receives the fallback RAR 102B2 corresponding to 2-step RA procedure #4 so that UE 101 performs 4-step RA procedure #1 according to the fallback RAR 102B2, UE 101 sets index of 4-step RA information INFO-41 of 4-step RA procedure #1 to be the sequence number of 2-step RA procedure #4. UE 101 stores 4-step RA information INFO-41 with index #4 in the second entry E21.

UE 101 stores 2-step RA information INFO-25 in the first entry E11. When the number of maximum transmission of MSG-A is reached, UE 101 sets indexes of 4-step RA information of the following 4-step RA procedures (i.e., index of 4-step RA information INFO-42 of 4-step RA procedures #2 and index of 4-step RA information INFO-43 of 4-step RA procedures #3) as absent or infinite. UE 101 stores 4-step RA information INFO-42 together with index, and 4-step RA information INFO-43 together with index in the second entry E21.

In some implementations, when the whole RA procedure is successful, if BS 102 requests RA report from UE 101 via a request message, UE 101 transmits the message 1010 to BS 102. The message 1010 includes the 2-step RA information in the first entry E11 and the 4-step RA procedure information in the second entry E21. After receiving the message 1010, BS 102 determines an order (i.e., chronological order) of the 2-step RA procedures #0 to #5 and the 4-step RA procedures #0 to #3 according to the 2-step RA information and the 4-step RA information.

In some implementations, when RA procedure between UE 101 and BS 102 is successful, if another BS (not shown) requests RA report from UE 101 via a request message, UE 101 may transmit the message 1010 to the another BS. The message 1010 includes the 2-step RA information in the first entry E11 and the 4-step RA procedure information in the second entry E21. After receiving the message 1010, the another BS determines an order (i.e., chronological order) of the 2-step RA procedures #0 to #5 and the 4-step RA procedures #0 to #3 according to the 2-step RA information and the 4-step RA information. For example, the another BS may be a BS that UE 101 subsequently connects with.

In some implementations, when the whole RA procedure is failed, if another BS (not shown) requests RA report from UE 101 via a request message, UE 101 may transmit the message 1010 to the another BS. The message 1010 includes the 2-step RA information in the first entry E11 and the 4-step RA procedure information in the second entry E21. After receiving the message 1010, the another BS determines an order (i.e., chronological order) of the 2-step RA procedures #0 to #5 and the 4-step RA procedures #0 to #3 according to the 2-step RA information and the 4-step RA information. For example, the another BS may be a BS that UE 101 performs RRC re-establishment with.

More specifically, when one index set to the 4-step RA information is the same as the sequence number of 2-step RA procedure, it means that the corresponding 4-step RA procedure follows the 2-step RA procedure. Therefore, after receiving the message 1010, BS 102 or the another BS determines the chronological order of the RA procedures as follows:

(1) 2-step RA procedure #0 corresponding to 2-step RA information INFO-20;
(2) 2-step RA procedure #1 corresponding to 2-step RA information INFO-21;
(3) 2-step RA procedure #2 corresponding to 2-step RA information INFO-22;
(4) 4-step RA procedure #0 corresponding to 4-step RA information INFO-40 with index #2 which is the same as the sequence number of 2-step RA procedure #2;
(5) 2-step RA procedure #3 corresponding to 2-step RA information INFO-23;
(6) 2-step RA procedure #4 corresponding to 2-step RA information INFO-24;
(7) 4-step RA procedure #1 corresponding to 4-step RA information INFO-41 with index #4 which is the same as the sequence number of 2-step RA procedure #4;
(8) 2-step RA procedure #5 corresponding to 2-step RA information INFO-25;
(9) 4-step RA procedure #2 corresponding to 4-step RA information INFO-42 with index absent/infinite;
(10) 4-step RA procedure #3 corresponding to 4-step RA information INFO-43 with index absent/infinite.

Figure 3D:
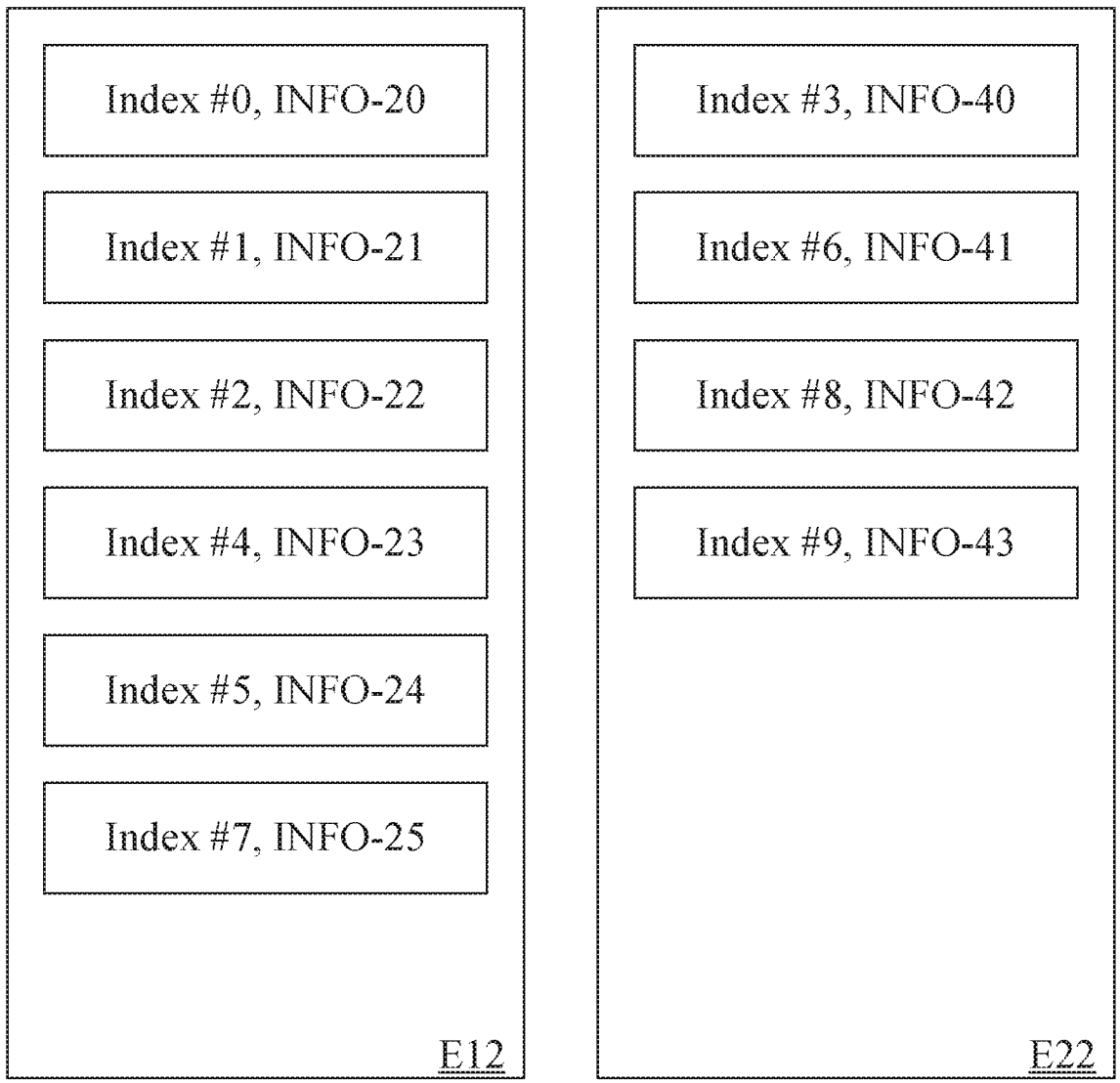

Please refer to FIG. 3D, which is a schematic diagram of association between the information of 2-step RA procedures and the information of 4-step RA procedures. In some implementations, information of 2-step RA procedures #0 to #5 and information of 4-step RA procedures #0 to #1 are associated by explicit index configured for each 2-step RA procedure/2-step RA information and 4-step RA procedure/4-step RA information.

In particular, during the whole RA procedure depicted in FIG. 3A, UE 101 sets different indexes to different information of 2-step RA procedures and 4-step RA procedures. More specifically, UE 101 sets index #0 to 2-step RA information INFO-20 of 2-step RA procedure #0. UE 101 stores 2-step RA information INFO-20 with index #0 in a first entry E12 which is configured to store information of 2-step RA procedure. UE 101 sets index #1 to 2-step RA information INFO-21 of 2-step RA procedure #1. UE 101 stores 2-step RA information INFO-21 with index #1 in the first entry E12. UE 101 sets index #2 to 2-step RA information INFO-22 of 2-step RA procedure #2. UE 101 stores 2-step RA information INFO-22 with index #2 in the first entry E12.

Because UE 101 receives the fallback RAR 102B1 corresponding to 2-step RA procedure #2 so that UE 101 performs 4-step RA procedure #0 according to the fallback RAR 102B1, UE 101 sets index #3 (which follows index #2 of 2-step RA information INFO-22 of 2-step RA procedure #2) to 4-step RA information INFO-40 of 4-step RA procedure #0. UE 101 stores 4-step RA information INFO-40 with index #3 in a second entry E22 which is configured to store information of 4-step RA procedure.

UE 101 sets index #4 to 2-step RA information INFO-23 of 2-step RA procedure #3. UE 101 stores 2-step RA information INFO-23 with index #4 in the first entry E12. UE 101 sets index #5 to 2-step RA information INFO-24 of 2-step RA procedure #4. UE 101 stores 2-step RA information INFO-24 with index #5 in the first entry E12.

Because UE 101 receives the fallback RAR 102B2 corresponding to 2-step RA procedure #4 so that UE 101 performs 4-step RA procedure #1 according to the fallback RAR 102B2, UE 101 sets index #6 (which follows index #5 of 2-step RA information INFO-24 of 2-step RA procedure #4) to 4-step RA information INFO-41 of 4-step RA procedure #1. UE 101 stores 4-step RA information INFO-41 with index #6 in the second entry E22.

UE 101 sets index #7 to 2-step RA information INFO-25 of 2-step RA procedure #5. UE 101 stores 2-step RA information INFO-25 with index #7 in the first entry E12. When the number of maximum transmission of MSG-A is reached, UE 101 respectively sets indexes #8 and #9 to 4-step RA information INFO-42 of 4-step RA procedure #2 and 4-step RA information INFO-43 of 4-step RA procedure #3. UE 101 stores 4-step RA information INFO-42 and INFO-43 in the second entry E22.

In some implementations, when the whole RA procedure is successful, if BS 102 requests RA report from UE 101 via a request message, UE 101 transmits the message 1010 to BS 102. The message 1010 includes the 2-step RA information in the first entry E12 and the 4-step RA procedure information in the second entry E22. After receiving the message 1010, BS 102 determines an order (i.e., chronological order) of the 2-step RA procedures #0 to #5 and the 4-step RA procedures #0 to #3 according to the 2-step RA information and the 4-step RA information.

In some implementations, when RA procedure between UE 101 and BS 102 is successful, if another BS (not shown) requests RA report from UE 101 via a request message, UE 101 may transmit the message 1010 to the another BS. The message 1010 includes the 2-step RA information in the first entry E12 and the 4-step RA procedure information in the second entry E22. After receiving the message 1010, the another BS may determine the order (i.e., chronological order) of the 2-step RA procedures #0 to #5 and the 4-step RA procedures #0 to #3 according to the 2-step RA information and the 4-step RA information. For example, the another BS may be a BS that UE 101 subsequently connects with.

In some implementations, when the whole RA procedure is failed, if another BS (not shown) requests RA report from UE 101 via a request message, UE 101 may transmit the message 1010 to the another BS. The message 1010 includes the 2-step RA information in the first entry E12 and the 4-step RA procedure information in the second entry E22. After receiving the message 1010, the another BS determines an order (i.e., chronological order) of the 2-step RA procedures #0 to #5 and the 4-step RA procedures #0 to #3 according to the 2-step RA information and the 4-step RA information. For example, the another BS may be a BS that UE 101 performs RRC re-establishment with.

More specifically, after receiving the message 1010, BS 102 or the another BS determines the chronological order of the RA procedures as follows:

(11) 2-step RA procedure #0 corresponding to 2-step RA information INFO-20 with index #0;
(12) 2-step RA procedure #1 corresponding to 2-step RA information INFO-21 with index #1;
(13) 2-step RA procedure #2 corresponding to 2-step RA information INFO-22 with index #2;
(14) 4-step RA procedure #0 corresponding to 4-step RA information INFO-40 with index #3;
(15) 2-step RA procedure #3 corresponding to 2-step RA information INFO-23 with index #4;
(16) 2-step RA procedure #4 corresponding to 2-step RA information INFO-24 with index #5;
(17) 4-step RA procedure #1 corresponding to 4-step RA information INFO-41 with index #6;
(18) 2-step RA procedure #5 corresponding to 2-step RA information INFO-25 with index #7;
(19) 4-step RA procedure #2 corresponding to 4-step RA information INFO-42 with index #8;
(20) 4-step RA procedure #3 corresponding to 4-step RA information INFO-43 with index #9.

Figure 4:
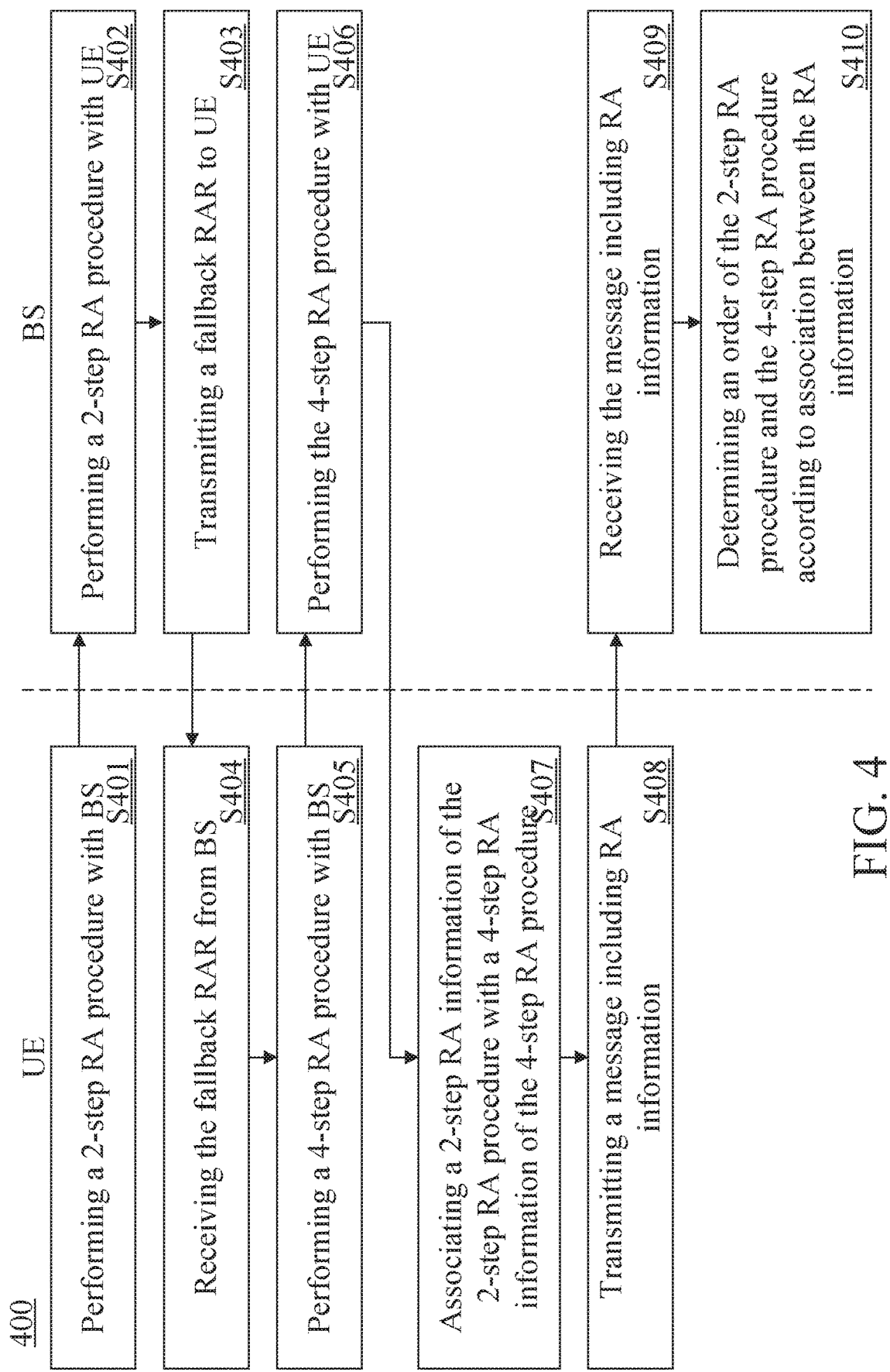
FIG. 4 illustrates a flow chart of a method for wireless communications according to an embodiment of the present disclosure.

FIG. 4 illustrates a flow chart of a method for wireless communications in accordance with some embodiments of the present application. Referring to FIG. 4, method 400 is performed by a UE and a BS (e.g., the UE 101 and the BS 102) in some embodiments of the present application.

In some embodiments, operation S401 is executed to perform, by the UE, a 2-step RA procedure with the BS. Operation S402 is executed to perform, by the BS, the 2-step RA procedure with the UE. When the 2-step RA procedure fails, operation S403 is executed to transmit, by the BS, a fallback RAR to the UE. Operation S404 is executed to receive, by the UE, the fallback RAR from the BS.

Operation S405 is executed to perform, by the UE, a 4-step RA procedure with the BS. Operation S406 is executed to perform, by the BS, the 4-step RA procedure with the UE. Operation S407 is executed to associate, by the UE, a 2-step RA information of the 2-step RA procedure with a 4-step RA information of the 4-step RA procedure. The 2-step RA information may be stored in a first entry. The 4-step RA information may be stored in a second entry.

Operation S408 is executed to transmit, by the UE, a message to the BS. The message may include the 2-step RA information and the 4-step RA information. Operation S409 is executed to receive, by the BS, the message from the UE. Operation S410 is executed to determine, by the BS, an order of the 2-step RA procedure and the 4-step RA procedure according to an association between the 2-step RA information and the 4-step RA information.

It should be noted that operations S408 to S410 may be executed by the UE and another BS which requests RA information from the UE. In some implementations, in operation S408, the UE transmits the message to the another BS. The message may include the 2-step RA information and the 4-step RA information. In operation S409, the another BS receives the message from the UE. In operation S410, the another BS determines the order of the 2-step RA procedure and the 4-step RA procedure according to the association between the 2-step RA information and the 4-step RA information.

Figure 5A:
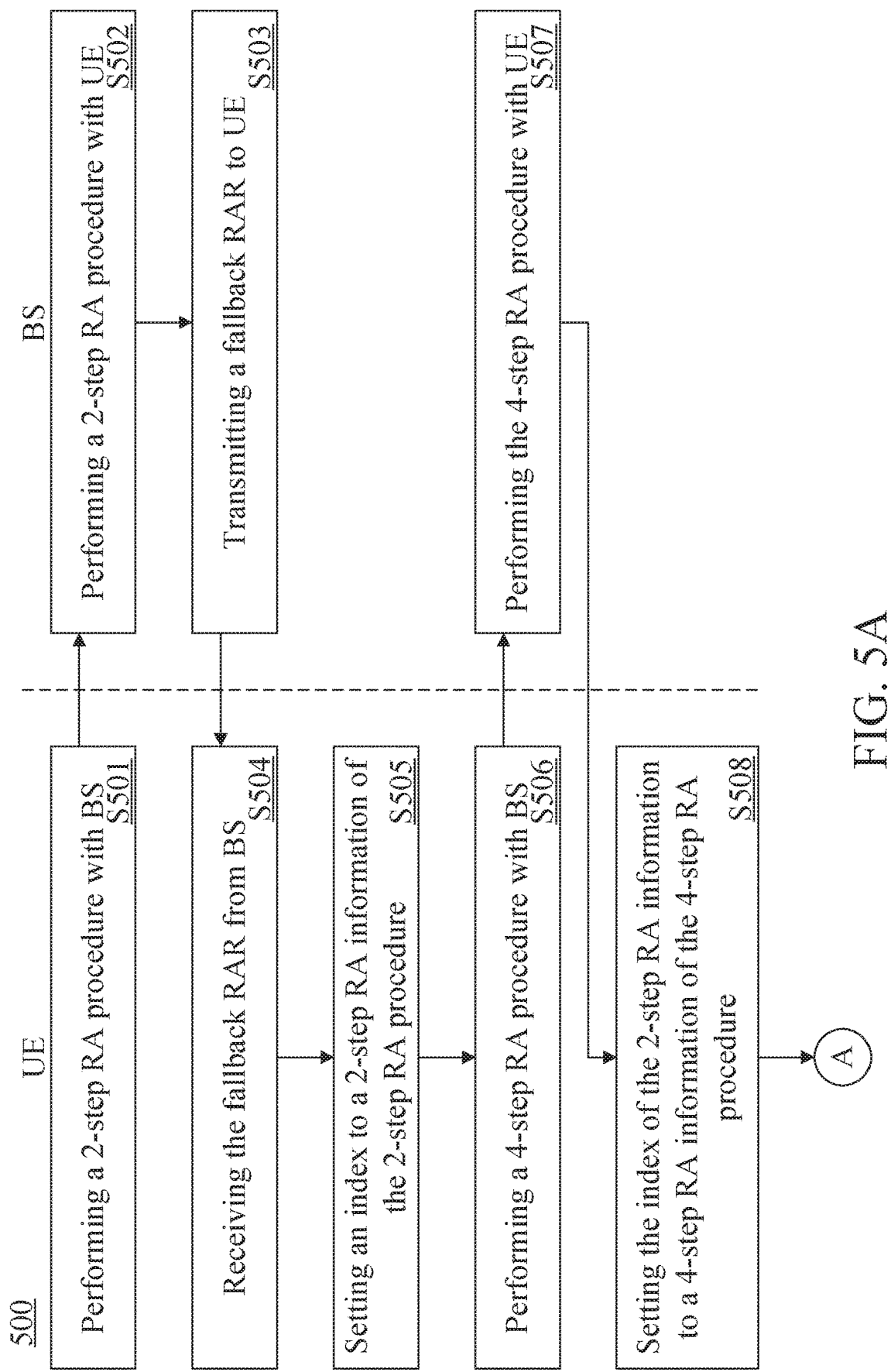
FIGS. 5A to 5C illustrate flow charts of a method for wireless communications according to an embodiment of the present disclosure.
Figure 5B:
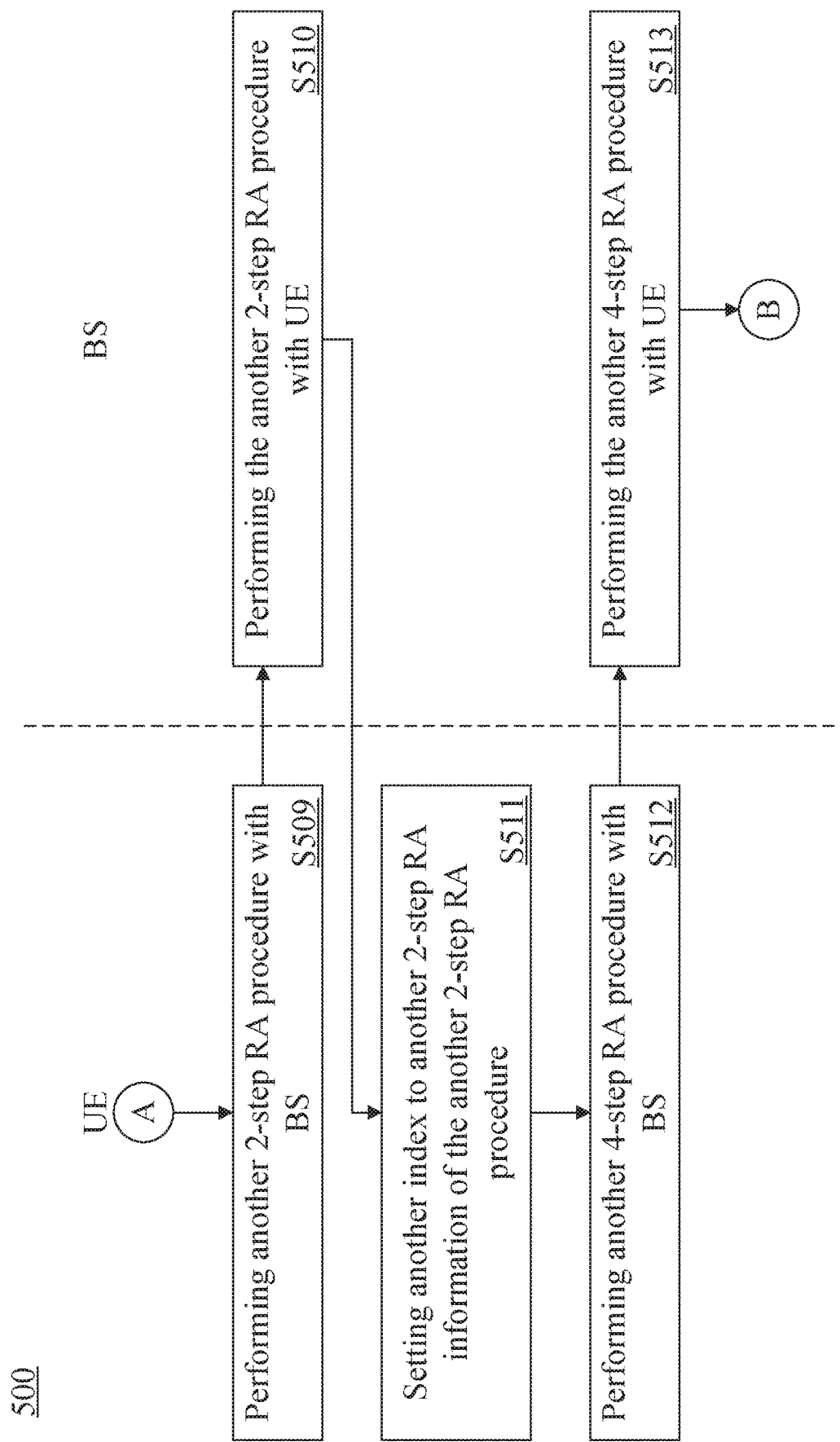
Figure 5C:
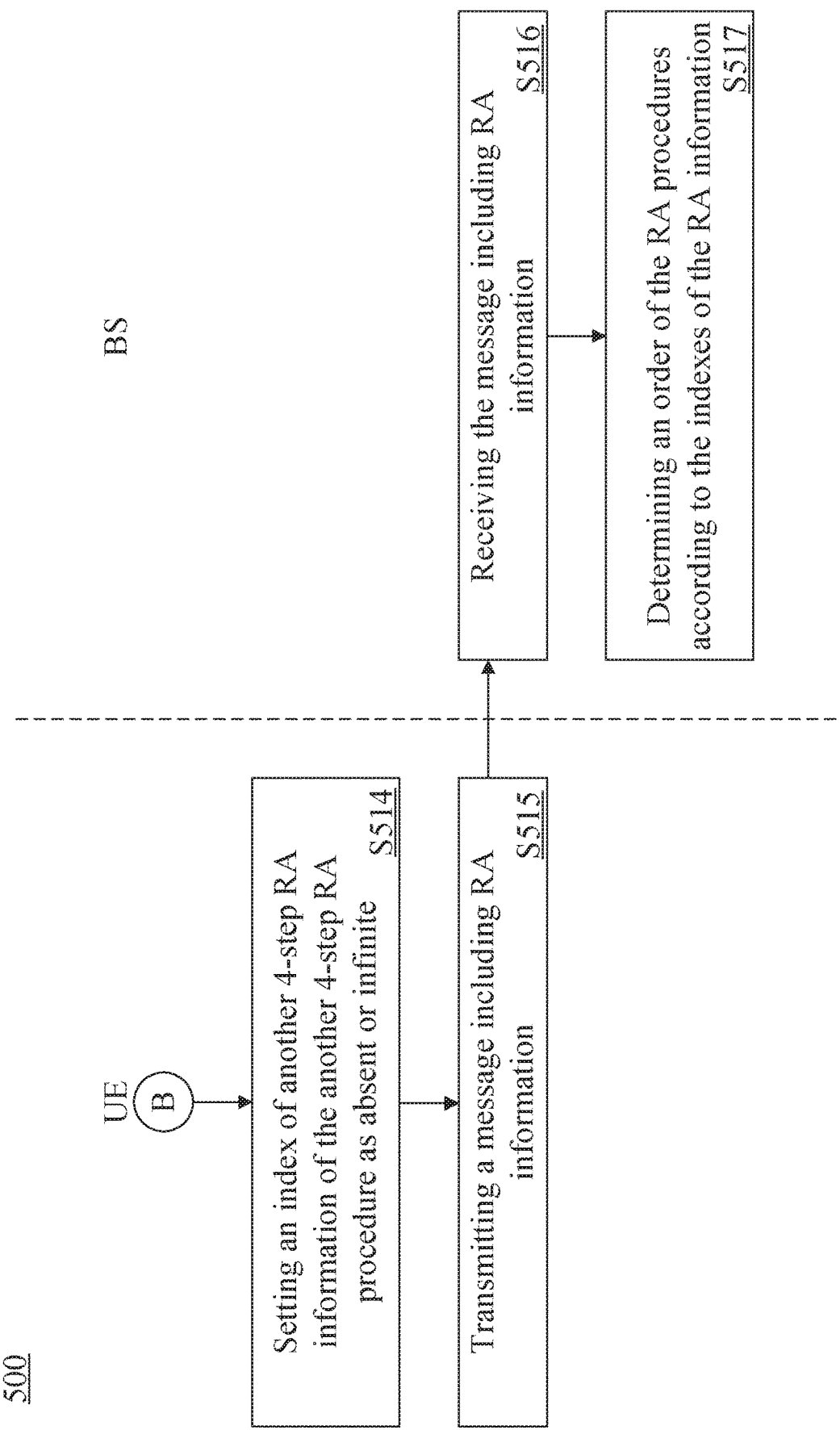

FIGS. 5A to 5C illustrate flow charts of a method for wireless communications in accordance with some embodiments of the present application. Referring to FIGS. 5A to 5C, method 500 is performed by a UE and a BS (e.g., the UE 101 and the BS 102) in some embodiments of the present application.

In some embodiments, operation S501 is executed to perform, by the UE, a 2-step RA procedure with the BS (i.e., the UE transmits MSG-A to the BS). Operation S502 is executed to perform, by the BS, the 2-step RA procedure with the UE (i.e., the BS encodes MSG-A from the UE, and sends response to the UE). When the 2-step RA procedure fails (e.g., the BS cannot encode MSG-A from the UE), operation S503 is executed to transmit, by the BS, a fallback RAR to the UE. Operation S504 is executed to receive, by the UE, the fallback RAR from the BS. Operation S505 is executed to set, by the UE, an index to a 2-step RA information of the 2-step RA procedure. The 2-step RA information with the index may be stored in a first entry.

Operation S506 is executed to perform, by the UE, a 4-step RA procedure with the BS (i.e., the UE transmits MSG-3 to the BS according to the fallback RAR). Operation S507 is executed to perform, by the BS, the 4-step RA procedure with the UE (i.e., the BS encodes MSG-3 from the UE, but contention resolution is not successful after MSG-3 (re)transmission(s)). Operation S508 is executed to set the index of the 2-step RA information to a 4-step RA information of the 4-step RA procedure. The 4-step RA information with the index may be stored in a second entry.

Operation S509 is executed to perform, by the UE, another 2-step RA procedure with the BS (i.e., the UE transmits another MSG-A to the BS, since contention resolution is not successful after MSG-3 (re)transmission(s) and the UE goes back to another 2-step RA procedure). Operation S510 is executed to perform, by the BS, the another 2-step RA procedure with the UE (i.e., the BS encodes the another MSG-A from the UE, and sends corresponding response to the UE). When the another 2-step RA procedure fails, operation S511 is executed to set, by the UE, another index to another 2-step RA information of the another 2-step RA procedure. The another index of the another 2-step RA information may follow the index of the 2-step RA information. The another 2-step RA information with the another index may be stored in the first entry.

When the another 2-step RA procedure fails and meanwhile a number of maximum transmission of MSG-A is reached, operation S512 is executed to perform, by the UE, another 4-step RA procedure with the BS (i.e., the UE transmits MSG-1 (i.e., preamble) to the BS since the number of maximum transmission of MSG-A is reached).

It should be noted that, when the another 2-step RA procedure fails but the number of maximum transmission of MSG-A is not reached, the UE preforms one or more 2-step RA procedure until the number of maximum transmission of MSG-A is reached, and then operation S512 is executed. Operation S513 is executed to perform, by the BS, the another 4-step RA procedure with the UE (i.e., the BS encodes the MSG 1 from the UE, and sends corresponding response to the UE). Operation S514 is executed to set, by the UE, an index of another 4-step RA information of the another 4-step RA procedure as absent or infinite when a maximum transmission number of MSG-A is reached. The another 4-step RA information with index of absent or infinite may be stored in the second entry.

After a whole RA procedure, operation S515 is executed to transmit, by the UE, a message to the BS. The message may include the RA information with the indexes. Operation S516 is executed to receive, by the BS, the message from the UE. Operation S517 is executed to determine, by the BS, an order of the RA procedures according to the indexes of the RA information.

It should be noted that operations S515 to S517 may be executed by the UE and another BS which requests RA information from the UE. In some implementations, in operation S515, the UE transmits the message to the another BS. The message may include the RA information with the indexes. In operation S516, the another BS receives the message from the UE. In operation S517, the another BS determines the order of the 2-step RA procedure and the 4-step RA procedure according to the indexes of the RA information.

In some implementations, when the BS determines that one index set to a 4-step RA information is same as one index set to a 2-step RA information, the BS then determines the corresponding 4-step RA procedure follows the corresponding 2-step RA procedure.

It should be noted that operations S501 to S517 illustrated in FIGS. 5A to 5C are for demonstrated purposes. Those having ordinary skill in the art would understand that the execution order of operations S501 to S517 may not be fixed, any of the operations may be skipped, or additional operation(s) may be executed between operations S501 to S517.

For examples, operation S505, S508, S511 or S514 may be executed at any suitable time before transmitting the message including RA information. Additional one or more 2-step RA procedure(s) can be performed between operations S501 to S509. Additional one or more 4-step RA procedure(s) fell back from a 2-step RA procedure can be performed between operations S501 to S509. Additional one or more 4-step RA procedure(s) can be performed between operations S512 to S515.

Figure 6A:
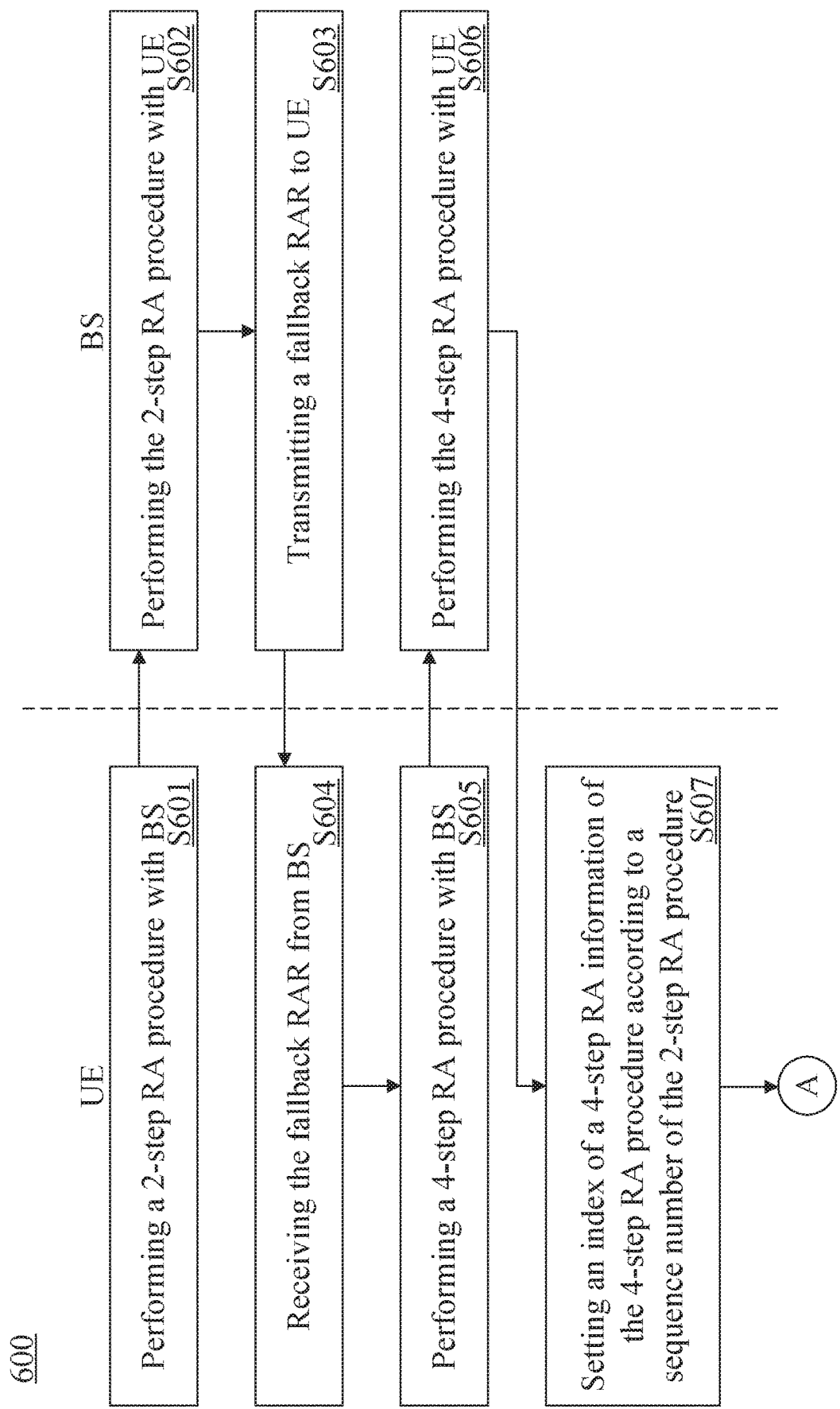
FIGS. 6A to 6C illustrate flow charts of a method for wireless communications according to an embodiment of the present disclosure.
Figure 6B:
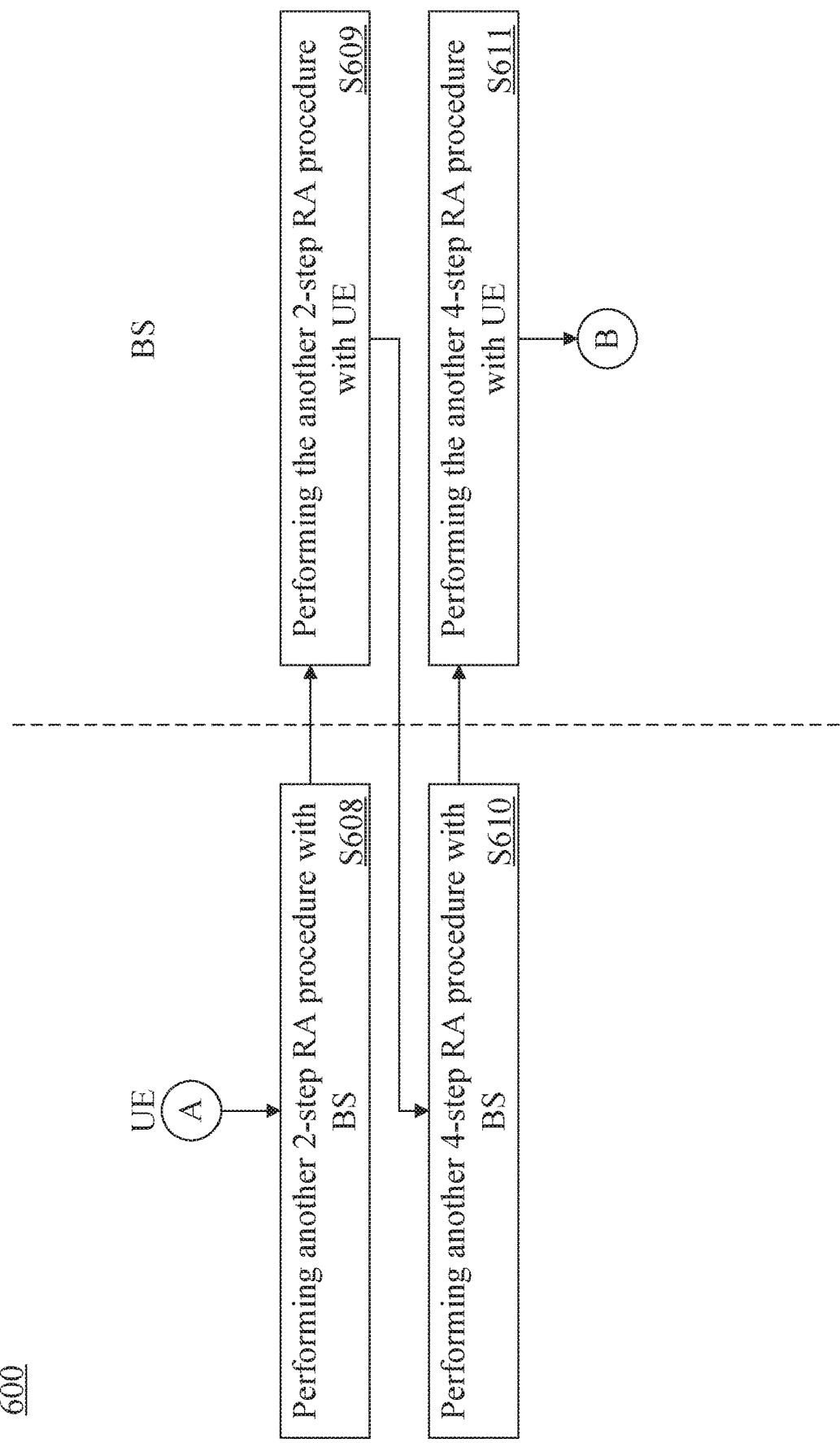
Figure 6C:
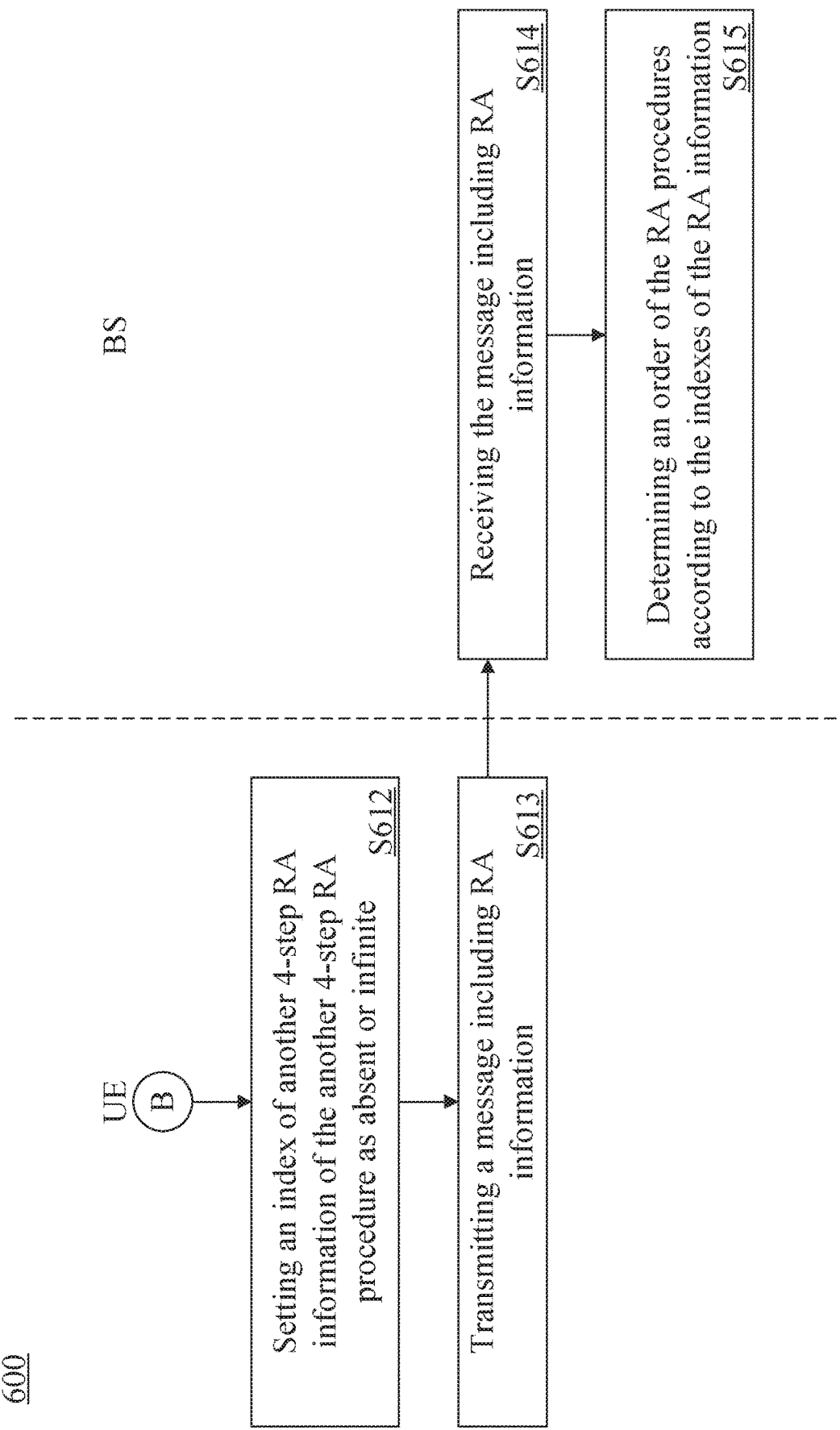

FIGS. 6A to 6C illustrate flow charts of a method for wireless communications in accordance with some embodiments of the present application. Referring to FIGS. 6A to 6C, method 600 is performed by a UE and a BS (e.g., the UE 101 and the BS 102) in some embodiments of the present application.

In some embodiments, operation S601 is executed to perform, by the UE, a 2-step RA procedure with the BS (i.e., the UE transmits MSG-A to the BS). Operation S602 is executed to perform, by the BS, the 2-step RA procedure with the UE (i.e., the BS encodes MSG-A from the UE, and sends response to the UE). When the 2-step RA procedure fails (e.g., the BS can't encode MSG-A from the UE), operation S603 is executed to transmit, by the BS, a fallback RAR to the UE. Operation S604 is executed to receive, by the UE, the fallback RAR from the BS.

Operation S605 is executed to perform, by the UE, a 4-step RA procedure with the BS (i.e., the UE transmits MSG-3 to the BS according to the fallback RAR). Operation S606 is executed to perform, by the BS, the 4-step RA procedure with the UE (i.e., the BS encodes MSG 3 from the UE, but contention resolution is not successful after MSG 3 (re)transmission(s)). Operation S607 is executed to set, by the UE, an index of a 4-step RA information of the 4-step RA procedure according to a sequence number of the 2-step RA procedure. 2-step RA information may be stored in a first entry. The 4-step RA information with the index may be stored in a second entry.

Operation S608 is executed to perform, by the UE, another 2-step RA procedure with the BS (i.e., the UE transmits another MSG A to the BS, since contention resolution is not successful after MSG3 (re)transmission(s) and the UE goes back to another 2-step RA procedure). Another 2-step RA information of the another 2-step RA procedure may be stored in the first entry. Operation S609 is executed to perform, by the BS, the another 2-step RA procedure with the UE.

When the another 2-step RA procedure fails and meanwhile a number of maximum transmission of MSG-A is reached, operation S610 is executed to perform, by the UE, another 4-step RA procedure with the BS (i.e., the UE transmits MSG-1 (i.e., preamble) to the BS, since the number of maximum transmission of MSG-A is reached).

It should be noted that, when the another 2-step RA procedure fails but the number of maximum transmission of MSG-A is not reached, the UE preforms one or more 2-step RA procedure until the number of maximum transmission of MSG-A is reached, and then operation S610 is executed. Operation S611 is executed to perform, by the BS, the another 4-step RA procedure with the UE (i.e., the BS encodes the MSG 1 from the UE, and sends corresponding response to the UE). Operation S612 is executed to set, by the UE, an index of another 4-step RA information of the another 4-step RA procedure as absent or infinite when a maximum transmission number of MSG-A is reached. The another 4-step RA information with index of absent or infinite may be stored in the second entry.

After a whole RA procedure, operation S613 is executed to transmit, by the UE, a message to the BS. The message may include the RA information with the indexes. Operation S614 is executed to receive, by the BS, the message from the UE. Operation S615 is executed to determine, by the BS, an order of the RA procedures according to the indexes of the RA information.

It should be noted that operations S613 to S615 may be executed by the UE and another BS which requests RA information from the UE. In some implementations, in operation S613, the UE transmits the message to the another BS. The message may include the RA information with the indexes. In operation S614, the another BS receives the message from the UE. In operation S615, the another BS determines the order of the 2-step RA procedure and the 4-step RA procedure according to the indexes of the RA information.

In some implementations, when the BS determines that one index set to a 4-step RA information is same as one sequence number of a 2-step RA procedure, the BS then determines the corresponding 4-step RA procedure follows the 2-step RA procedure.

It should be noted that operations S601 to S615 illustrated in FIGS. 6A to 6C are for demonstrated purposes. Those having ordinary skill in the art would understand that the execution order of operations S601 to S615 may not be fixed, any of the operations may be skipped, or additional operation(s) may be executed between operations S601 to S615.

For examples, operation S607 or S612 may be executed at any suitable time before transmitting the message including RA information. Additional one or more 2-step RA procedure(s) can be performed between operations S601 to S608. Additional one or more 4-step RA procedure(s) fell back from a 2-step RA procedure can be performed between operations S601 to S608. Additional one or more 4-step RA procedure(s) can be performed between operations S610 to S613.

Figure 7A:
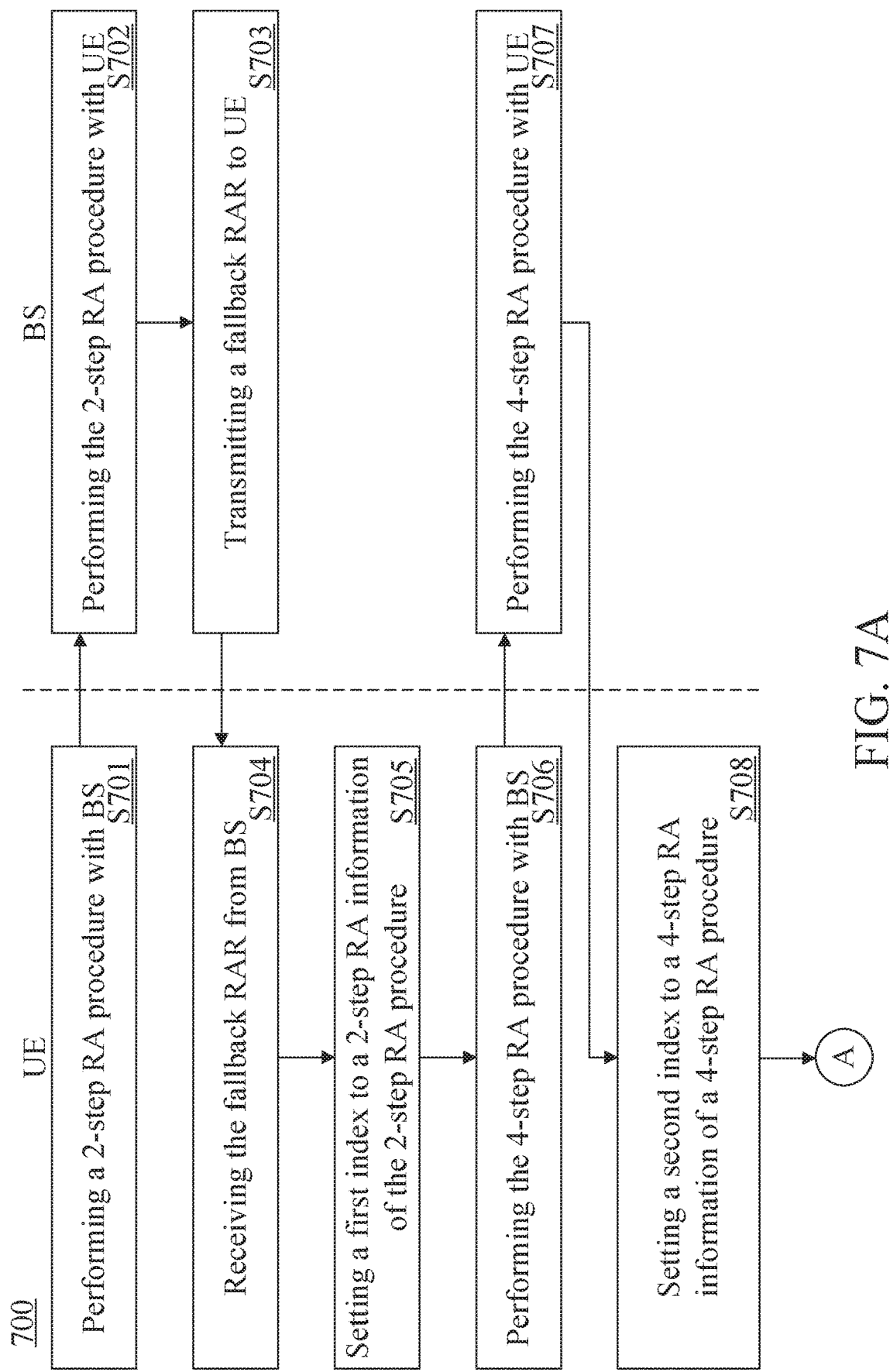
FIGS. 7A to 7C illustrate flow charts of a method for wireless communications according to an embodiment of the present disclosure.
Figure 7B:
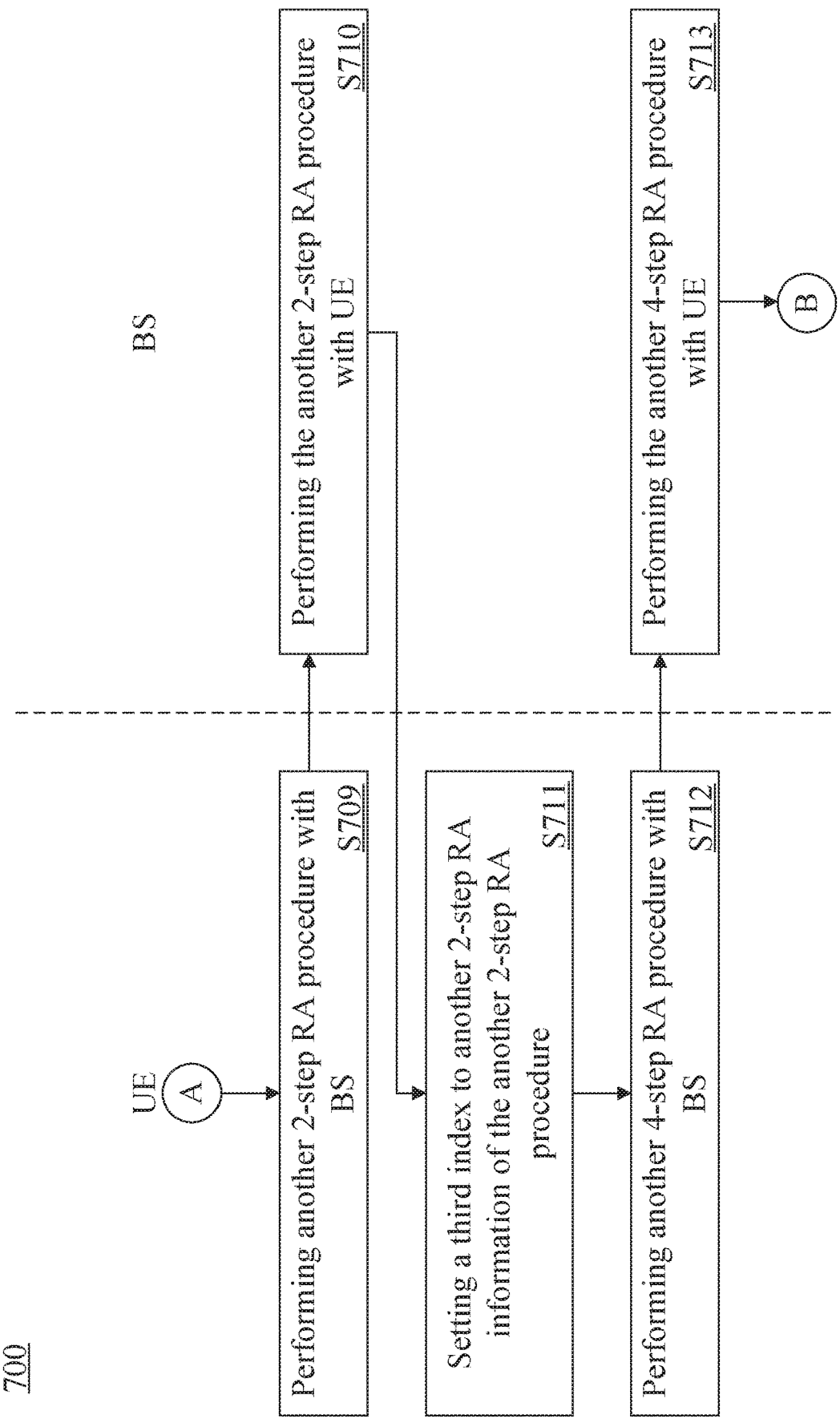
Figure 7C:
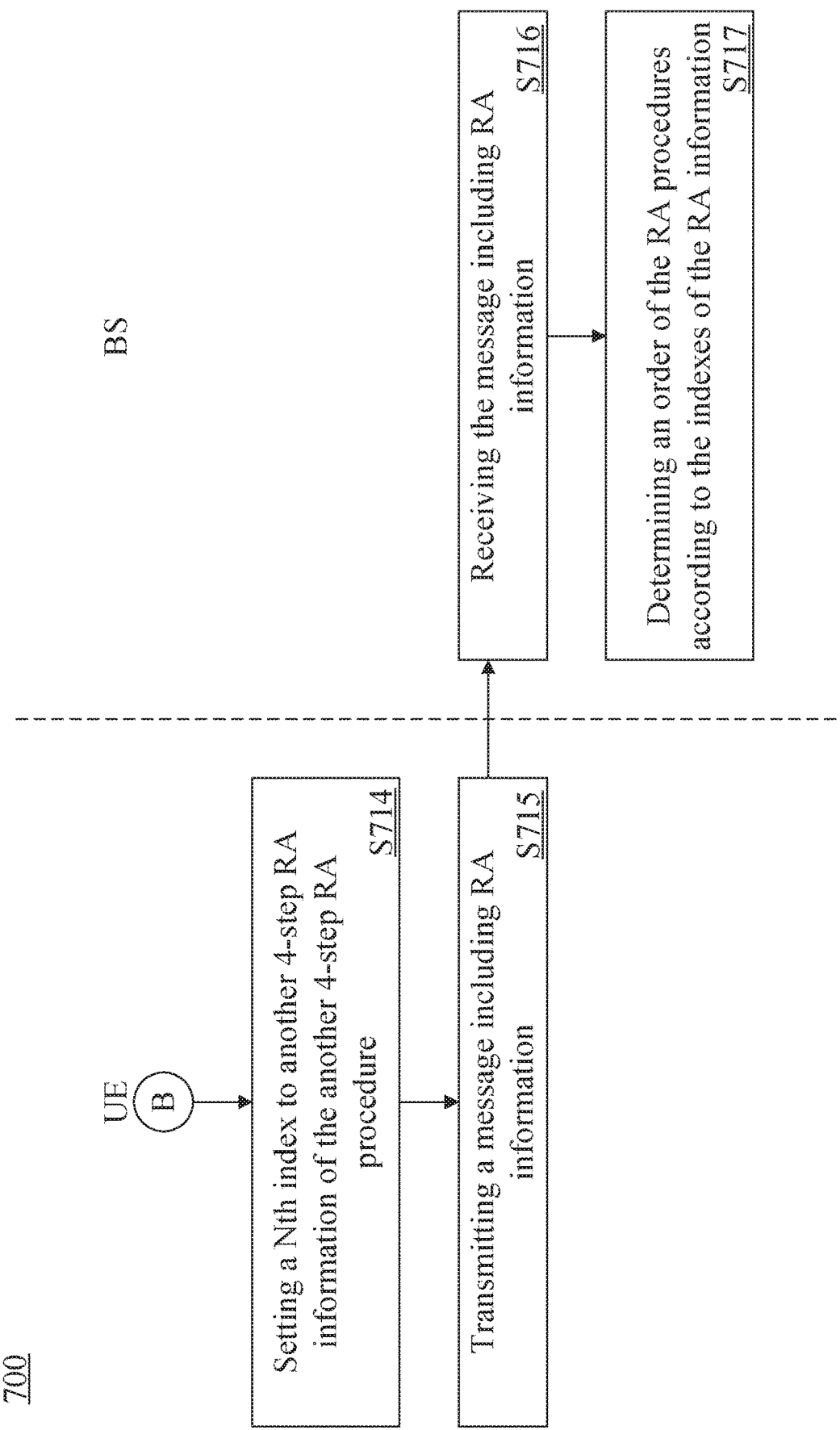

FIGS. 7A to 7C illustrate flow charts of a method for wireless communications in accordance with some embodiments of the present application. Referring to FIGS. 7A to 7C, method 700 is performed by a UE and a BS (e.g., the UE 101 and the BS 102) in some embodiments of the present application.

In some embodiments, operation S701 is executed to perform, by the UE, a 2-step RA procedure with the BS (i.e., the UE transmits MSG A to the BS). Operation S702 is executed to perform, by the BS, the 2-step RA procedure with the UE (i.e., the BS encodes MSG A from the UE, and sends response to the UE). When the 2-step RA procedure fails e.g. the BS can't encode MSG A from the UE, operation S703 is executed to transmit, by the BS, a fallback RAR to the UE. Operation S704 is executed to receive, by the UE, the fallback RAR from the BS. Operation S705 is executed to set, by the UE, a first index to a 2-step RA information of the 2-step RA procedure. The 2-step RA information with the first index may be stored in a first entry.

Operation S706 is executed to perform, by the UE, a 4-step RA procedure with the BS (i.e., the UE transmits MSG 3 to the BS according to the fallback RAR). Operation S707 is executed to perform, by the BS, the 4-step RA procedure with the UE, e.g. the BS encodes MSG 3 from the UE, but contention resolution is not successful after MSG 3 (re)transmission(s). Operation S708 is executed to set a second index to a 4-step RA information of the 4-step RA procedure. The second index may follows the first index. The 4-step RA information with the second index may be stored in a second entry.

Operation S709 is executed to perform, by the UE, another 2-step RA procedure with the BS (i.e., the UE transmits another MSG A to the BS, since contention resolution is not successful after MSG3 (re)transmission(s) and the UE goes back to another 2-step RA procedure). Operation S710 is executed to perform, by the BS, the another 2-step RA procedure with the UE (i.e., the BS encodes the another MSG A from the UE, and sends corresponding response to the UE). When the another 2-step RA procedure fails, operation S711 is executed to set, by the UE, a third index to another 2-step RA information of the another 2-step RA procedure. The third index may follow the second index. The another 2-step RA information with the third index may be stored in the first entry.

When the another 2-step RA procedure fails and meanwhile a number of maximum transmission of MSG-A is reached, operation S712 is executed to perform, by the UE, another 4-step RA procedure with the BS (i.e., the UE transmits MSG-1 (i.e., preamble) to the BS, since the number of maximum transmission of MSG-A is reached).

It should be noted that, when the another 2-step RA procedure fails but the number of maximum transmission of MSG-A is not reached, the UE performs at least one 2-step RA procedure, and each of at least one 2-step RA information of the at least one 2-step RA procedure is set with one index. When the at least one 2-step RA procedure includes a plurality of 2-step RA procedures, a plurality of indexes is utilized for the plurality of 2-step RA procedures, and theses indexes are sequentially dispatched. Then, until the number of maximum transmission of MSG-A is reached, operation S712 is executed.

Operation S713 is executed to perform, by the BS, the another 4-step RA procedure with the UE (i.e., the BS encodes the MSG-1 from the UE, and sends corresponding response to the UE). Operation S714 is executed to set, by the UE, a Nth index to another 4-step RA information of the another 4-step RA procedure. The Nth index may follow the latest dispatched index. The another 4-step RA information with Nth index may be stored in the second entry.

After a whole RA procedure, operation S715 is executed to transmit, by the UE, a message to the BS. The message may include the RA information with the indexes. Operation S716 is executed to receive, by the BS, the message from the UE. Operation S717 is executed to determine, by the BS, an order of the RA procedures according to order of the indexes of the RA information.

It should be noted that operations S715 to S717 may be executed by the UE and another BS which requests RA information from the UE. In some implementations, in operation S715, the UE transmits the message to the another BS. The message may include the RA information with the indexes. In operation S716, the another BS receives the message from the UE. In operation S717, the another BS determines the order of the 2-step RA procedure and the 4-step RA procedure according to the indexes of the RA information.

It should be noted that operations S701 to S717 illustrated in FIGS. 7A to 7C are for demonstrated purposes. Those having ordinary skill in the art would understand that the execution order of operations S701 to S717 may not be fixed, any of the operations may be skipped, or additional operation(s) may be executed between operations S701 to S717.

For examples, operation S705, S708, S711 or S714 may be executed at any suitable time before transmitting the message including RA information. Additional one or more 2-step RA procedure(s) can be performed between operations S701 to S709. Additional one or more 4-step RA procedure(s) fell back from a 2-step RA procedure can be performed between operations S701 to S709. Additional one or more 4-step RA procedure(s) can be performed between operations S712 to S715.

Figure 8:
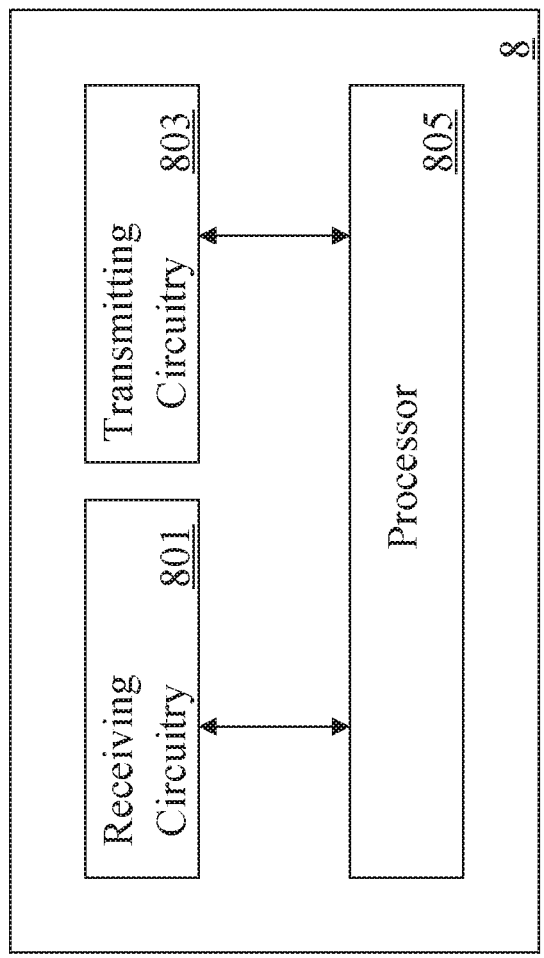
FIG. 8 illustrates a block diagram of an exemplary apparatus in accordance with some embodiments of the present application.

FIG. 8 illustrates an example block diagram of an apparatus 8 according to an embodiment of the present disclosure.

As shown in FIG. 8, the apparatus 8 may include at least one non-transitory computer-readable medium (not illustrated in FIG. 8), a receiving circuitry 801, a transmitting circuitry 803, and a processor 805 coupled to the non-transitory computer-readable medium (not illustrated in FIG. 8), the receiving circuitry 801 and the transmitting circuitry 803. The apparatus 8 may be a UE or a BS.

Although in this figure, elements such as processor 805, transmitting circuitry 803, and receiving circuitry 801 are described in the singular, the plural is contemplated unless limitation to the singular is explicitly stated. In some embodiments of the present disclosure, the receiving circuitry 801 and the transmitting circuitry 803 are combined into a single device, such as a transceiver. In certain embodiments of the present disclosure, the apparatus 8 may further include an input device, a memory, and/or other components.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 805 interacting with receiving circuitry 801 and transmitting circuitry 803, so as to perform the operations with respect to UE and BS depicted in FIG. 2.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. An apparatus, comprising:
a memory; and
a processor coupled to the memory, the processor configured to cause the apparatus to:
perform a 2-step random access (RA) procedure with a base station;
receive a fallback RA response (RAR) from the base station;
perform a 4-step RA procedure with the base station according to the fallback RAR;
set a first index to 2-step RA information of the 2-step RA procedure;
associate the 2-step RA information of the 2-step RA procedure with a 4-step RA information of the 4-step RA procedure by setting a second index to the 4-step RA information of the 4-step RA procedure, wherein the second index of the 4-step RA information follows the first index of the 2-step RA information;
perform another 2-step RA procedure with the base station when the 4-step RA procedure fails and a maximum transmission number of a message A (MSG-A) is not reached; and
set a third index to another 2-step RA information of the another 2-step RA procedure, wherein the third index of the another 2-step RA information follows the second index of the 4-step RA information.

2. The apparatus of claim 1, wherein to associate the 2-step RA information of the 2-step RA procedure with the 4-step RA information of the 4-step RA procedure, the processor is configured to cause the apparatus to:
set the second index of the 4-step RA information of the 4-step RA procedure according to a sequence number of the 2-step RA information of the 2-step RA procedure.

3. The apparatus of claim 2, wherein the processor is configured to cause the apparatus to:
set another sequence number to the another 2-step RA information of the another 2-step RA procedure, wherein the another sequence number of the another 2-step RA information follows the sequence number of the 2-step RA information.

4. The apparatus of claim 3, wherein the processor is configured to cause the apparatus to:
perform another 4-step RA procedure with the base station when the maximum transmission number of the A MSG-A is reached; and
set a fourth index of the another 4-step RA information of the another 4-step RA procedure as absent or infinite.

5. The apparatus of claim 1, wherein the 2-step RA information is stored in a first entry, and the 4-step RA information is stored in a second entry, and the processor is configured to cause the apparatus to:
transmit a message to the base station, wherein the message includes information in the first entry and information in the second entry.

6. An apparatus, comprising:
a memory; and
a processor coupled to the memory, the processor configured to cause the apparatus to:
perform a 2-step random access (RA) procedure with a user equipment;
transmit a fallback RA response (RAR) to the user equipment when the 2-step RA procedure fails;
perform a 4-step RA procedure with the user equipment after transmitting the fallback RAR, wherein a first index is set to 2-step RA information of the 2-step RA procedure;
receive a message from the user equipment, wherein the message includes the 2-step RA information related to the 2-step RA procedure and 4-step RA information related to the 4-step RA procedure;
determine an order of the 2-step RA procedure and the 4-step RA procedure according to an association between the 2-step RA information and the 4-step RA information, wherein the association is based on a second index set to the 4-step RA information of the 4-step RA procedure, wherein the second index of the 4-step RA information follows the first index of the 2-step RA information; and
perform another 2-step RA procedure with the user equipment when the 4-step RA procedure fails and a maximum transmission number of a message A (MSG-A) is not reached, wherein a third index is set to another 2-step RA information of the another 2-step RA procedure, wherein the third index of the another 2-step RA information follows the second index of the 4-step RA information.

7. The apparatus of claim 6, wherein to determine the order of the 2-step RA procedure and the 4-step RA procedure, the processor is configured to cause the apparatus to:
    determine that the second index set to the 4-step RA information is same as another index set to the 2-step RA information to obtain a determination result; and
    determine the order of the 2-step RA procedure and the 4-step RA procedure according to the determination result.

8. The apparatus of claim 6, wherein to determine the order of the 2-step RA procedure and the 4-step RA procedure, the processor is configured to cause the apparatus to:
    determine that the second index set to the 4-step RA information is same as a sequence number of the 2-step RA information to obtain a determination result; and
    determine the order of the 2-step RA procedure and the 4-step RA procedure according to the determination result.

9. The apparatus of claim 6, wherein to determine the order of the 2-step RA procedure and the 4-step RA procedure, the processor is configured to cause the apparatus to:
    determine that a fourth index set to the 4-step RA information is absent or infinite to obtain a determination result; and
    determine the order of the 2-step RA procedure and the 4-step RA procedure according to the determination result.

10. The apparatus of claim 6, to determine the order of the 2-step RA procedure and the 4-step RA procedure, the processor is configured to cause the apparatus to:
    determine that the second index set to the 4-step RA information follows another index set to the 2-step RA information to obtain a determination result; and
    determine the order of the 2-step RA procedure and the 4-step RA procedure according to the determination result.

11. A method, comprising:
    performing a 2-step random access (RA) procedure with a base station;
    receiving a fallback RA response (RAR) from the base station;
    performing a 4-step RA procedure with the base station according to the fallback RAR;
    setting a first index to 2-step RA information of the 2-step RA procedure;
    associating the 2-step RA information of the 2-step RA procedure with a 4-step RA information of the 4-step RA procedure by setting a second index to the 4-step RA information of the 4-step RA procedure, wherein the second index of the 4-step RA information follows the first index of the 2-step RA information;
    perform another 2-step RA procedure with the base station when the 4-step RA procedure fails and a maximum transmission number of a message A (MSG-A) is not reached; and
    set a third index to another 2-step RA information of the another 2-step RA procedure, wherein the third index of the another 2-step RA information follows the second index of the 4-step RA information.

12. The method of claim 11, wherein associating the 2-step RA information of the 2-step RA procedure with the 4-step RA information of the 4-step RA procedure comprises:
    setting the second index of the 4-step RA information of the 4-step RA procedure according to a sequence number of the 2-step RA information of the 2-step RA procedure.

13. The method of claim 12, further comprising:
    setting another sequence number to the another 2-step RA information of the another 2-step RA procedure, wherein the another sequence number of the another 2-step RA information follows the sequence number of the 2-step RA information.

14. The method of claim 13, further comprising:
    performing another 4-step RA procedure with the base station when the maximum transmission number of the MSG-A is reached; and
    setting a fourth index of another 4-step RA information of the another 4-step RA procedure as absent or infinite.

* * * * *